United States Patent
Terajima

(10) Patent No.: US 9,523,861 B2
(45) Date of Patent: Dec. 20, 2016

(54) LENS DRIVING DEVICE WITH IMAGE STABLILIZER FUNCTION

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kokichi Terajima, Tokyo (JP)

(73) Assignees: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

( * ) Notice: Subject to any disclaimer, the term of this patent is extended or adjusted under 35 U.S.C. 154(b) by 164 days.

(21) Appl. No.: 14/275,943

(22) Filed: May 13, 2014

(65) Prior Publication Data
US 2014/0376090 A1    Dec. 25, 2014

(30) Foreign Application Priority Data
Jun. 20, 2013    (JP) .................................. 2013-129471

(51) Int. Cl.
*G02B 27/64*    (2006.01)
*H02K 41/035*    (2006.01)

(52) U.S. Cl.
CPC ......... *G02B 27/646* (2013.01); *H02K 41/0356* (2013.01)

(58) Field of Classification Search
CPC ............. G02B 7/02; G02B 7/023; G02B 7/04; G02B 7/08; G02B 7/09; G02B 7/28; G02B 13/001; G02B 15/14–15/15; G02B 27/64; G02B 27/646–27/648; G03B 3/10; G03B 5/02; G03B 2205/0007–2205/0015; G03B 2205/0069; G03B 13/34; G03B 13/36; G03B 2217/005; H04N 5/23248–5/24264; H04N 5/2328; H04N 5/23287
USPC ................ 359/554, 557, 811, 813–814, 819, 359/822–824; 396/52, 53, 55, 133; 348/208.99–208.5, 208.7, 208.11, 208.12, 348/208.16, 345, 357
See application file for complete search history.

(56) References Cited

U.S. PATENT DOCUMENTS

| | | | |
|---|---|---|---|
| 2011/0096178 A1* | 4/2011 | Ryu ..................... | H04N 5/2252 348/208.2 |
| 2012/0092768 A1* | 4/2012 | Shiraki ................ | G02B 27/646 359/557 |
| 2012/0229901 A1* | 9/2012 | Moriya ................... | G03B 3/10 359/557 |

\* cited by examiner

*Primary Examiner* — Stephone B Allen
*Assistant Examiner* — James McGee
(74) *Attorney, Agent, or Firm* — Hemisphere Law, PLLC

(57) ABSTRACT

The present invention provides a lens driving device with image stabilizer function with high driving efficiency of second coils for swinging the lens, and the swing part is light. A lens support accommodating the first coil wound around the Z axis, and a base are respectively connected with first spring components extending along the direction perpendicular to the Z direction. The second coils are wound around the X direction and the Y direction and configured on the outer side of the first coil. A lens carrier and a carrier bracket provided with the second coils are connected with the second spring component extending along the Z direction. The second spring component is supported by the lens carrier and can swing in the X direction and the Y direction.

2 Claims, 22 Drawing Sheets

LENS DRIVING DEVICE WITH IMAGE STABLILIZER FUNCTION

BACKGROUND OF THE INVENTION

1. Field of the Invention

The present invention relates to a lens driving device used in a camera such as a portable phone, and in particular to a lens driving device with image stabilizer function.

2. Description of Related Art

Many cameras on sale have an image stabilizer function. An object is focused by moving a lens disposed in the camera forwards or backwards relative to the object to be shot, and meanwhile the lens is swung in a direction perpendicular to the shooting direction of the lens, thus blur flow of the image imaged on an image sensor is inhibited. For example, Japan patent application JP 2011-65140 discloses a lens driving device for auto focus which is suspended supported in the Z direction, the lens driving device can swing in X direction and Y direction relative to a base.

As shown in FIGS. 21A and 21B, in the lens driving device 600 with image stabilizer function, a structure for enabling the lens driving device 601 for auto focus to swing in the X direction and the Y direction is adopted. The lens driving device 601 includes a lens support 602 for retaining the lens 614 with an optical axis in the Z direction, a focusing coil 603 wound around the Z direction and disposed on the lens support 602, four permanent magnets 604 which are disposed on the circumferential side of the above components and retained on a magnet support 605, an upper side plate spring 606 and a lower side plate spring 607 which extend along a direction perpendicular to the Z direction, and an upper side base plate 608 and a stopper 609 which are used for holding the upper side plate spring 606 and the lower side plate spring 607. The upper side plate spring 606 and the lower side plate spring 607 are connected with the magnet support 605 and used for suspended supporting the lens support 602.

Namely, the lens driving device 601 acting as a swing part is suspended supported by the base 610 through four suspension electric wires 611. Each suspension electric wire 611 is extending along the Z direction, one end of which is connected with the base 610, and the other end sides of which is also connected with the lens driving device 601. Thus the lens driving device for auto focus is suspended supported and may swing towards the X direction and the Y direction. Moreover, coils 612a and 612b for image stabilizing wound in the X axis and the Y axis are disposed on the inner wall of the side face of a shielding cover 613, and the coils for image stabilizing are oppositely disposed with each other and spaced at an interval by taking an outer magnetic pole face of the permanent magnet 604 as reference. When the coils 612a and 612b are electrified, the Lorentz force in the Y direction and the X direction is generated in the coils 612a and 612b for image stabilizing. Reacting force corresponding to the Lorentz force is generated on the permanent magnet 604 disposed in the lens driving device 601 for auto focus. Therefore, the suspended lens driving device 601 for auto focus may swing towards directions opposite to the Lorentz force.

However, the whole lens driving device 601 including the permanent magnet 604 with large mass is supported by the four suspension electric wires 611 in a suspended manner. When the posture of the camera changes by rotating the shooting direction to the horizontal direction from the vertical direction, the suspension electric wire 611 is bent and deformed through gravity action of the lens driving device 601 for auto focus as the swing part, the center of the lens 614 is biased towards the X direction or the Y direction, the center of the image formed on an unshown image sensor disposed on the base 610 is also biased towards the X direction or the Y direction, and distortion is performed on the image formed in the image sensor.

In order to prevent the problem, the following complicated control method is adopted, namely, in the lens driving device 600 with image stabilizer function, a position detecting mechanism 615 including Hall elements is disposed on the base 610, and is used for detecting whether the lens driving device 601 for auto focus disposed on the suspension electric wire 611 in a suspended manner is biased towards the X direction and the Y direction from the center (also called off-centering) and supplying off-centering correcting current to the coils 612a and 612b for image stabilizing, so that the coils 612a and 612b for image stabilizing are respectively electrified by image stabilizing current repeatedly until the lens driving device 601 for auto focus returns to a proper central position.

Therefore, an additional part or an additional control circuit for generating the correcting current is needed to be set in the lens driving device 600, thus the lens driving device 600 is in large size, the part cost or assembling cost is increased, and the power consumption is further increased.

BRIEF SUMMARY OF THE INVENTION

The object of the present invention is to provide an improved lens driving device with image stabilizer function, the lens driving device has a light-weight swing part for realizing image stabilizer function and can efficiently generate swinging thrust force thus there is no need of off-centering correction assembly.

A lens driving device with image stabilizer function includes a lens carrier, a carrier bracket, a base, at least one first coil, a plurality of second coils, a plurality of permanent magnets, at least one first spring component, and a plurality of second spring components. The lens carrier is configured for mechanically holding a lens whose optical axis is defined as Z axis and an object to be shot is desired to be positioned in the +Z direction. The at least one first coil is wound around the Z axis and disposed on the carrier bracket. The second coils are wound around one or more axis perpendicular to the Z axis, the plurality of second coils is configured on the lens carrier and on the outer side of the at least one first coil. The permanent magnets are disposed on the outer side of the plurality of the second coils, one of the magnetic pole faces of each permanent magnets is arranged towards the center of the lens. The at least one first spring component extends along a plane perpendicular to the Z axis, one end of each first spring component connects to the carrier bracket, the other end of the first spring component connects to the base. The second spring components extend in the Z direction, one end of each second spring component connects to the carrier bracket, and the other end of each second spring component connects to the lens carrier. The spiral wind surface of each second coil faces to is spaced apart from the magnetic pole face which is arranged towards the center of the lens of a corresponding one of the permanent magnets at an interval. The side surface adjacent the spiral wind surface of each first coil faces to and is spaced apart from the magnetic pole faces which are arranged towards the center of the lens of the permanent magnets through the center openings of the second coils.

Preferably, the lens driving device with image stabilizer function further includes a magnet yoke assembly having a plurality of side face magnet yokes and retained on the base. Each side face magnet yoke is arranged to face a side face of a corresponding permanent magnet with spacing therebetween, the side face of the permanent magnet is adjacent to the magnetic pole face which is arranged towards the center of the lens.

Preferably, the lens driving device with image stabilizer function further includes a magnet yoke assembly having a plurality of middle magnet yokes and retained on the base. Each middle magnet yoke is arranged to face the magnetic pole face which is arranged towards the center of the lens of a corresponding one of the permanent magnets with spacing therebetween, the first coil is configured between the middle magnet yokes and the permanent magnets, and there are gaps between the first coil and the middle magnet yokes.

The present invention further provides a lens driving device with image stabilizer function. The lens driving device includes a lens carrier, a carrier bracket, a base, at least one first coil, a plurality of second coils, a plurality of permanent magnets, at least one first spring component, and a plurality of second spring components. The lens carrier is used for retaining a lens taking the direction of an object to be shot as the +Z direction and taking the Z direction as its optical axis. The at least one first coil is wound around the Z axis and disposed on the carrier bracket. The second coils are wound around a plurality of axises parallel to to the Z axis, and are configured on the lens carrier and positioned on the front side and the back side of the permanent magnets respectively or positioned on one of the front side and back side of the permanent magnets. The permanent magnets are disposed on the outer side of the at least one first coil, one of the magnetic pole faces of each permanent magnets is arranged towards the center of the lens. The at least one first spring component extends along a plane perpendicular to the Z axis, one end of each first spring component connects to the carrier bracket, the other end of the first spring component connects to the base. The second spring components extend in the Z direction, one end of each second spring component connects to the carrier bracket, and the other end of each second spring component connects to the lens carrier. A spiral wind surface of each second coil is arranged to face a side surface of a corresponding one of the permanent magnets with spacing therebetween, the side surface is adjacent the magnetic pole face which is arranged towards the center of the lens. A side surface adjacent the spiral wind surface of each first coil is arranged to face to and spaced apart from the magnetic pole faces which are arranged towards the center of the lens of the permanent magnets through the centre openings of the second coils.

Preferably, the lens driving device with image stabilizer function further includes a magnet yoke assembly having a plurality of side face magnet yokes and retained on the base. Each side face magnet yoke is arranged to face a side face of a corresponding permanent magnet with spacing therebetween, the side face of the permanent magnet is adjacent to the magnetic pole face which is arranged towards the center of the lens.

Preferably, the lens driving device with image stabilizer function further includes a magnet yoke assembly having a plurality of middle magnet yokes and retained on the base. Each middle magnet yoke is arranged to face the magnetic pole face which is arranged towards the center of the lens of a corresponding permanent magnet with spacing therebetween, the first coil is configured between the middle magnet yokes and the permanent magnets, and there are gaps between the first coil and the middle magnet yokes.

The present invention provides a lens driving device with image stabilizer function, the swing part of the lens driving device is lightweight, and the driving efficiency of the second coil for swinging is improved. Therefore, the lens carrier can be supported in a suspended manner by utilizing the second spring component for swinging with large spring coefficient, so that off-centering of the lens can be omitted. As a result, the lens driving device with image stabilizer function does not need the position detecting mechanism or an offset correcting control circuit, and miniaturization, low cost and low power consumption can be realized.

BRIEF DESCRIPTION OF THE SEVERAL VIEWS OF THE DRAWING(S)

The foregoing and other exemplary purposes, aspects and advantages of the present invention will be better understood in principle form the following detailed description of one or more exemplary embodiments of the invention with reference to the drawings, in which.

DETAILED DESCRIPTION OF THE INVENTION

Hereinafter, the embodiments of the lens driving device with image stabilizer function will be further described in detail with reference of the attached drawings and the specific embodiments. The following embodiments do not intend to confine the present invention relevant to the scope of claims, and all combinations of the features described in the embodiments are not necessarily included in the solutions of the present invention.

Embodiment I

Figure 1:
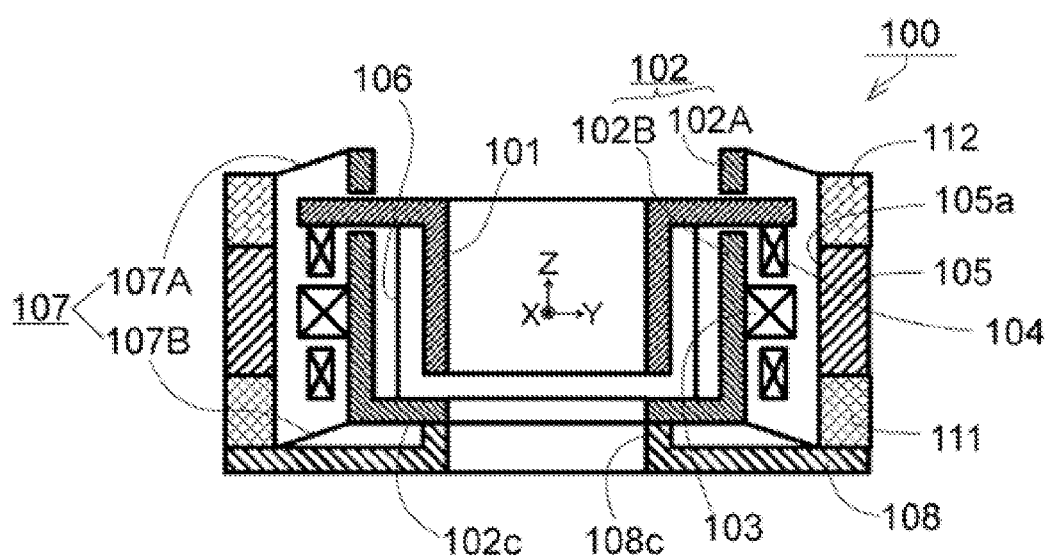
FIG. 1 is a longitudinal cross-section view of a lens driving device with image stabilizer function according to a first embodiment of the present invention.
Figure 2:
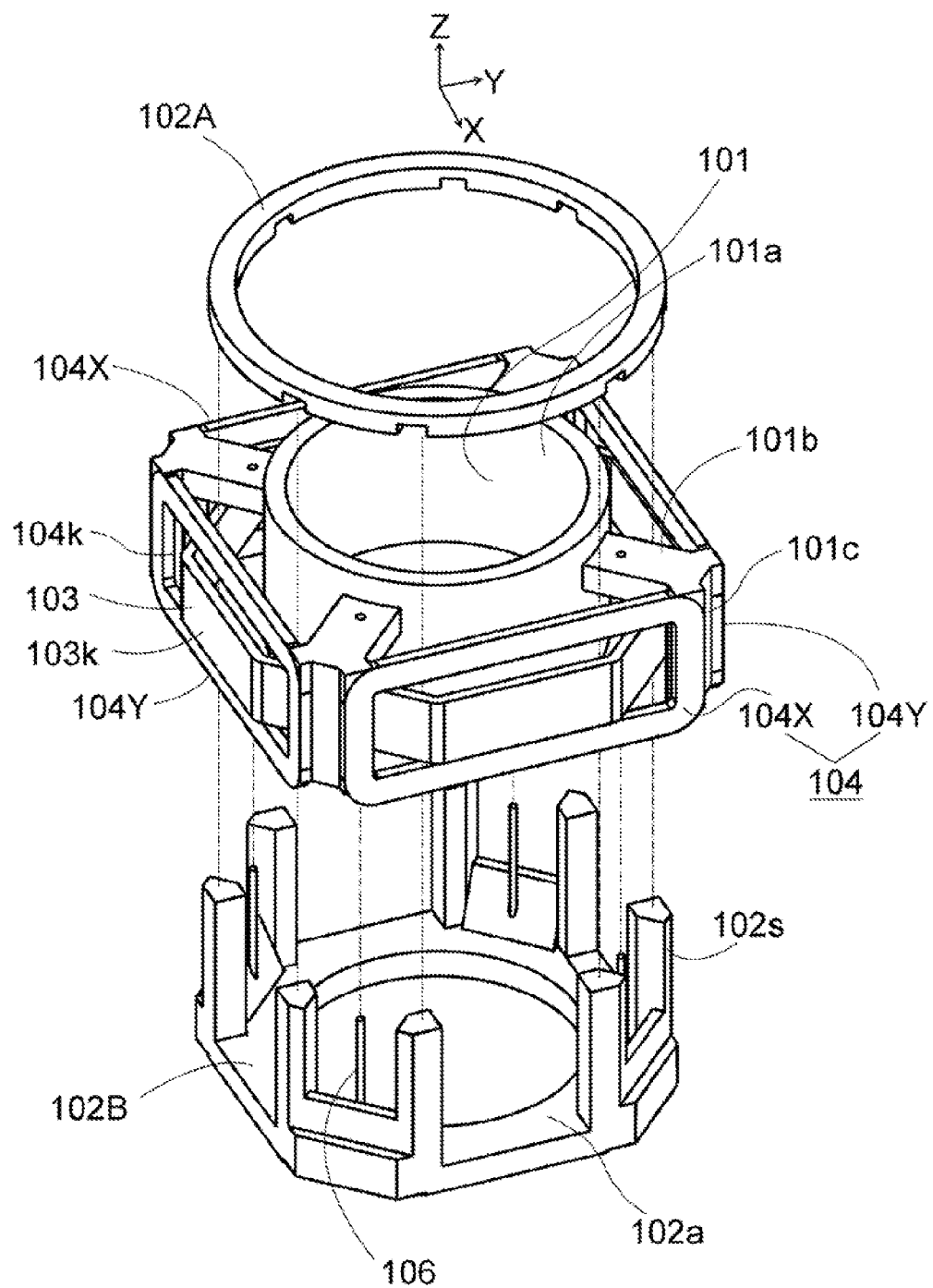
FIG. 2 is an exploded view of a main part of a swing suspension of the lens driving device with image stabilizer function according to the first embodiment.
Figure 3:
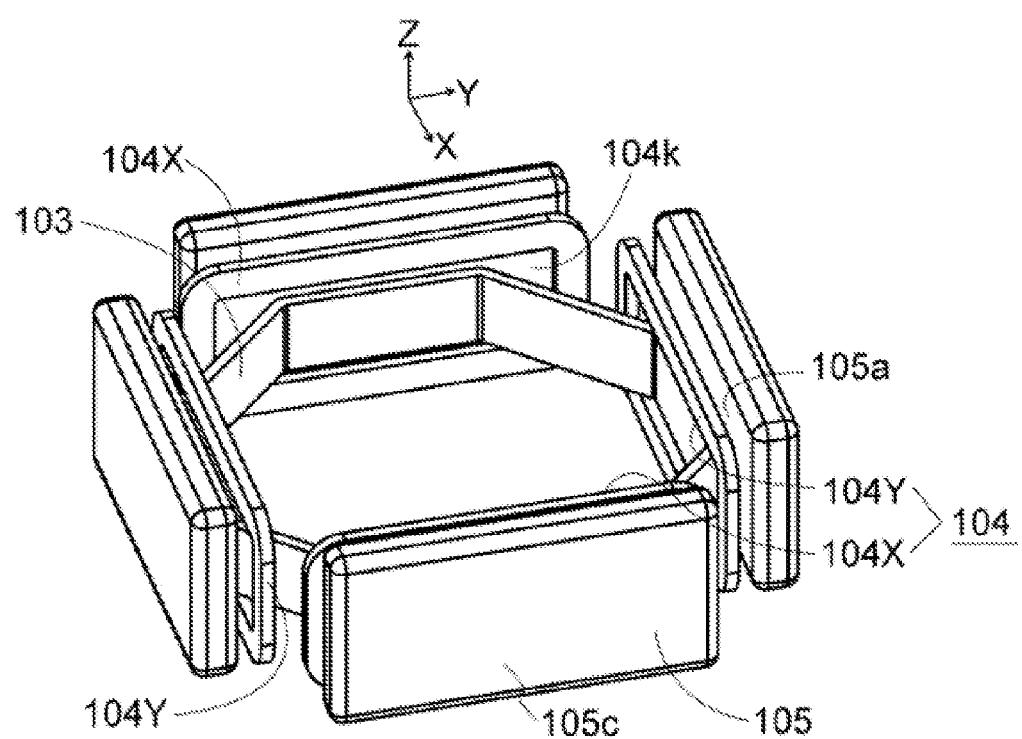
FIG. 3 is a perspective view of permanent magnets, a first coil and second coils of the lens driving device with image stabilizer function according to the first embodiment.
Figure 4:
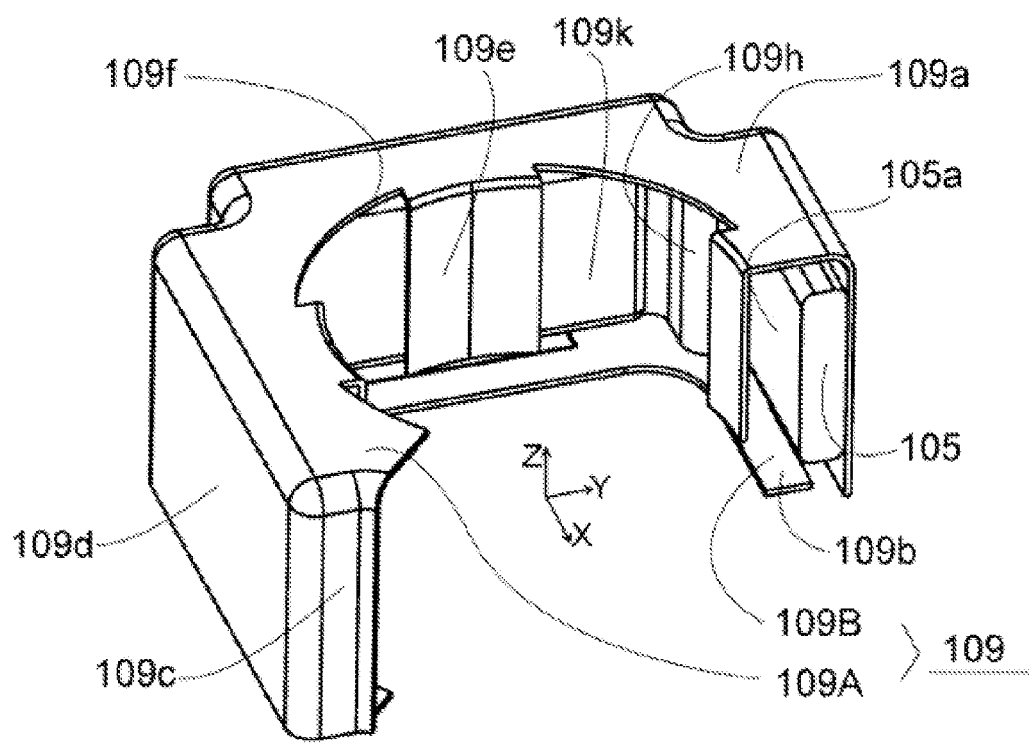
FIG. 4 is a perspective view of a magnetic loop structure in the lens driving device with image stabilizer function according to the first embodiment.
Figure 5:
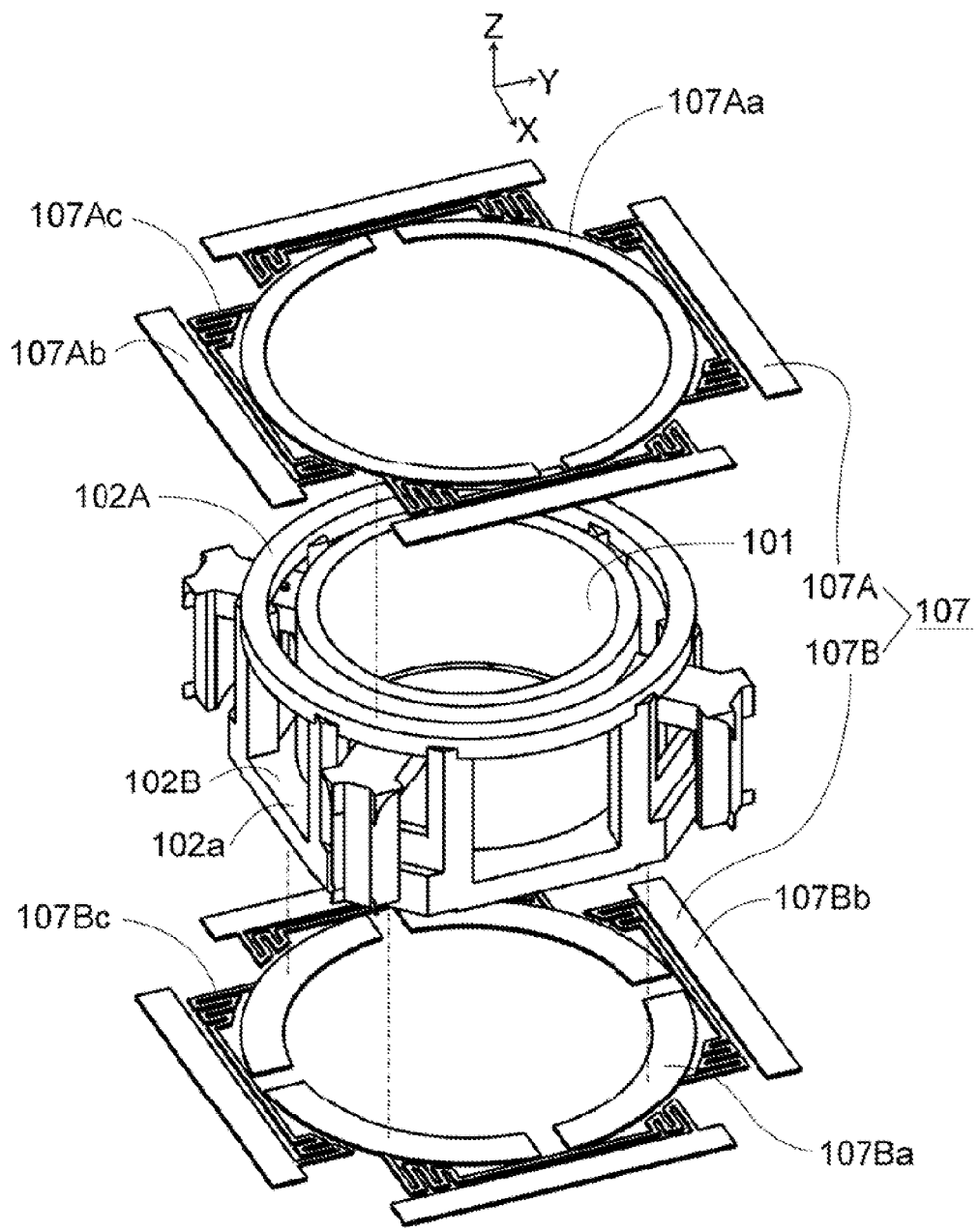
FIG. 5 is an exploded view of a part of a suspension utilizing a first spring component of the lens driving device with image stabilizer function according to the first embodiment.
Figure 6:
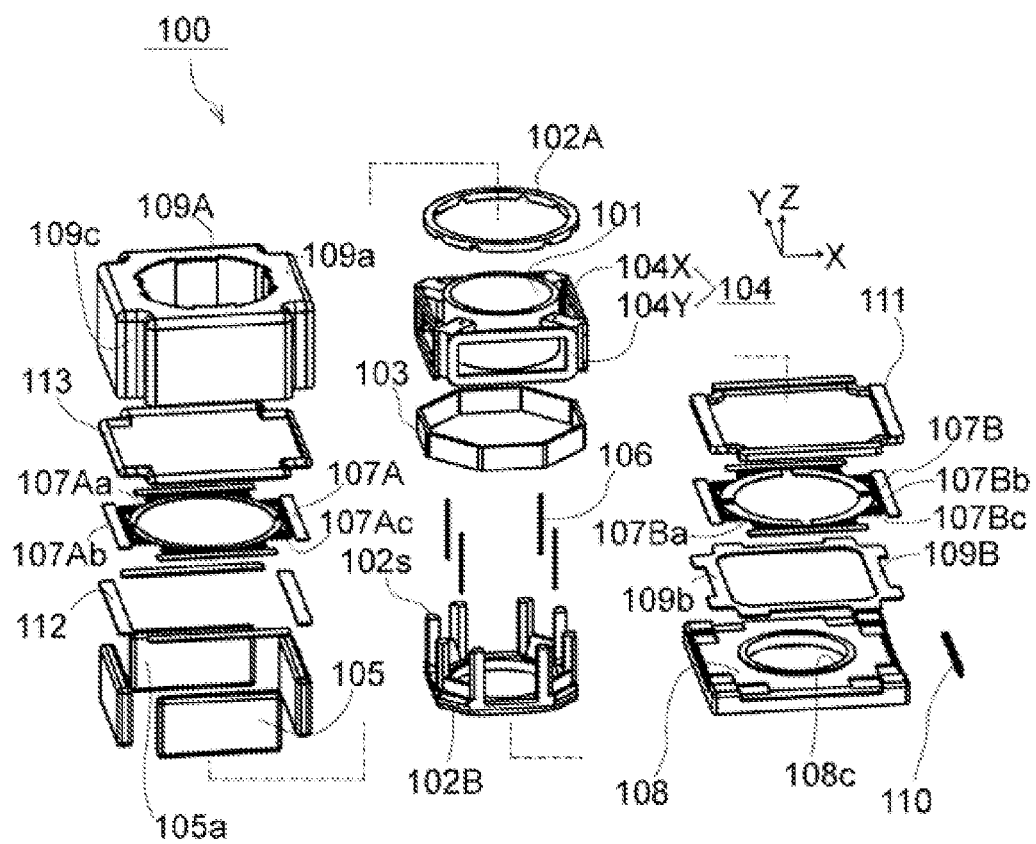
FIG. 6 is a decomposition perspective view of the lens driving device with image stabilizer function according to the first embodiment.

FIG. 1 is a longitudinal cross-section view of a lens driving device 100 with image stabilizer function according to a first embodiment of the present invention. FIG. 2 is an exploded view of a main part of a swing suspension of the lens driving device 100 according to the first embodiment of the present invention. FIG. 3 is a perspective view of a main part illustrating the position relationship between the permanent magnets and the second coils for swinging the lens (not shown) as well as the first coil(s) for moving the lens. FIG. 4 is a cutoff view illustrating magnetic loops utilizing the permanent magnet and the magnet yoke. FIG. 5 is a perspective view illustrating the suspension utilizing a first spring component for moving the lens. Moreover, FIG. 6 is whole exploded view of the lens driving device 100 according to the first embodiment of the present invention.

To clearly describe the present invention, the optical axis of the unshown lens is defined as Z axis of a Cartesian coordinate system for a three-dimensional space, and the object to be shot is in the +Z direction (+Z side). When a component of the lens driving device 100 is positioned closer the object to be shot than another component, the component is referred to "in front of the another component". And a front surface of a component is closer to the object to be shot than a back surface of the component, and so on.

As shown in FIG. 1, the lens driving device 100 includes a lens (not shown in the figures), a lens carrier 101, a carrier bracket 102, at least one first coil 103 for moving the lens along the Z axis/direction, a plurality of second coils 104 for swinging the lens in the X axis/direction and Y axis/direction, a plurality of permanent magnets 105, a plurality of second spring components 106 for swinging the lens in the X axis/direction and Y axis/direction, a plurality of first spring components 107 for moving the lens along the Z axis/direction, and a base 108.

The lens carrier 101 is used for retaining and supporting the lens, and is supported in a suspended manner by the carrier bracket 102 to swing in the X direction and the Y direction. The carrier bracket 102 is supported to be moved in the Z direction by the base 108. The carrier bracket 102 includes a front side carrier bracket 102A and a back side carrier bracket 102B. One end of the second spring component 106 extending along the Z direction is connected with the carrier bracket 102, the other end is connected with the lens carrier 101, and the lens carrier 101 can swing in the X direction and the Y direction. Moreover, the inner circumferential side of the first spring component 107 which extends along one or more directions perpendicular to the Z direction is connected with the carrier bracket 102, the outer circumferential side thereof is connected with the base 108, and the carrier bracket 102 can move in the Z direction. According to the diagram, it is clear that the lens carrier 101 can swing in the X direction and the Y direction, no matter where the position of the carrier bracket 102 moving along the Z direction during auto focus operation is.

As shown in FIG. 2, the lens carrier 101 includes a barrel-shaped lens retaining part 101a defining an opening in the Z direction. Four connecting parts 101b for connecting the second spring components respectively protrude outwards along the radius direction (from diagonal positions which close to the front side of the lens retaining part 101a) from the side wall of the lens retaining part 101. Four retaining parts 101c for receiving the second coil extend in the Z direction from the external front end of the connecting part 101b. As mentioned above, the carrier bracket 102 includes the front side carrier bracket 102A and the back side carrier bracket 102B. The front side carrier bracket 102A is a ring-shaped component with an opening defined in the Z direction. Moreover, the central part of the back side carrier bracket 102B opens in the Z direction, and includes an octagonal tubular connecting part 102a for connecting the second spring component 106. Eight bar-shaped retaining parts 102s for fixing the first coil extend in the Z direction forwardly from the inner sides of corner parts of the connecting part 102a, and are disposed around the lens retaining part 101a at preset intervals.

Each retaining part 102s extends along the +Z direction to a position in front of the front surface of the connecting part 101b from the connecting part 102a, and stands between two adjacent connecting parts 101b. In detail, every two retaining parts 102s stands on both sides of a corresponding connecting part 101b. Then, the front ends of the retaining parts 102s are connected with the back surface of the front side carrier bracket 102A. The lens carrier 101 is clamped by the carrier bracket 102 at an interval in the Z direction, and the lens carrier 101 is suspended supported to swing.

At the back of the connecting part 101b in the Z direction, namely at the middle of two retaining parts 102s, the back ends of four second spring components 106 extending along the Z direction are connected with the connecting part 102a of the back side carrier bracket 102B, and the front end of the second spring component 106 is connected with the connecting part 101b of the lens carrier 101. Thus, the back end of the lens retaining part 101a in the lens carrier 101 is spaced apart from the front surface of the connecting part 102a of the back side carrier bracket 102B with spacing in the Z direction. The front surface connecting part 101b of the second spring component 101b is arranged to face the back surface of the front side carrier bracket 102A with spacing therebetween in the Z direction.

As a result, the lens carrier 101 is suspended supported by the carrier bracket 102 and can swing in the X direction and the Y direction.

As shown in FIG. 1 and FIG. 3, four permanent magnets 105 are respectively formed in rectangular shapes and arranged around the Z axis, and each permanent magnet is provided with a magnetic pole face 105a on the inner circumferential side. The second coils 104 include two X side coils 104X wound around the X direction axis and two Y side coils 104Y wound around the Y direction axis, the X side coils 104X and the Y side coils 104Y are in pairs respectively, thereof the spiral wind surface of each second coil faces to and is spaced apart from the magnetic pole face 105a of the corresponding permanent magnet 105 at an interval. With such a configuration, the formed second coils 104 are retained by adhering the edges, respectively parallel to the Z axis, of the X side coils 104X and the Y side coils 104Y to the retaining part 101c of the lens carrier 101.

As mentioned above, the lens driving device 100 with image stabilizer function is provided with lightweight swing part which includes the lens carrier 101, the second coils 104 and the unshown lens.

Moreover, in the embodiment, two pairs of coils such as a pair of X side coils 104X and a pair of Y side coils 104Y (four second coils in total) are used as second coils 104, but are not limited to this, and also can be deformed variously as required, for example, any coil (in single direction) of the X side coil 104X and the Y side coil 104Y is utilized for swinging operation, or only a pair of an X side coil 104X and a Y side coil 104Y are utilized for swinging operation.

As shown in FIG. 1 to FIG. 3, the first coil 103 is wound around the Z axis and formed in an octagonal frame shape, and is configured on the inner sides of the four permanent magnets 105, every other side face 103k is wound to be protruded out through the central opening 104k of the X side coils 104X and the Y side coils 104Y, and is oppositely disposed facing the magnetic pole face 105a of the permanent magnet 105 with an interval therebetween. The configured first coil 103 is retained on the outer circumferential parts of the eight retaining parts 102s on the back side carrier bracket 102B, in other words, the first coil 103 is sleeved on the eight retaining parts 102s.

As mentioned above, the swing part of the lens driving device 100 with image stabilizer function is provided with lightweight swing part which just includes the unshown lens, the lens carrier 101 and the second coil 104.

FIG. 4 is a perspective view of a main part of the magnet yoke 109. Moreover, in the diagram, the cross section of the magnet yoke 109 is cut and shown so as to show the internal structure in detail.

The magnet yoke 109 is formed in a rectangular box shape and defines an opening in the Z direction, and the four permanent magnets 105 are wrapped on the outer circumferential side of the magnet yoke 109. The magnet yoke 109 includes a front magnet yoke 109A and a back magnet yoke 109B, which are respectively formed by stretching or punching strong magnetic sheet material composed of soft iron and the like. The front magnet yoke 109A is integrally formed with a front side yoke 109a, four transverse side yokes 109c, four back face yokes 109d and four inner side yokes 109e, and the back magnet yoke 109B includes a plane back side yoke 109b separately formed with respect to the front magnet yoke 109A.

The front side yoke 109a extends along a surface perpendicular to the Z axis in front of the permanent magnets 105 so as to form a plate surface with a circular opened central part, in other words, define a circular central opening. In the transverse side yokes 109c, side face corners of the magnet yoke 109 are depressed and hollowed. Accordingly, four projection parts 109h are protruded towards the center of the magnet yoke 109, and are in the narrow gap parts between the circularly configured permanent magnets 105. Moreover, each inner side yoke 109e extends from the inner side 109f defining the opening 109k of the front side yoke 109a along the front side yoke surface and then bend to extend in the Z direction, and a rectangular shape is formed. The back side yoke 109b extends along the direction perpendicular to the Z direction at the back of the permanent magnet 105 so as to form a plate surface with a quadrate opened central part.

The front side yoke 109a and the front side face of the permanent magnet 105, adjacent to the magnetic pole face 105a are oppositely disposed and spaced apart from each other in the Z direction, in other words, the front side yoke 109a is arranged to face the front side face of the permanent magnet 105 with an air gap therebetween. In cross section each transverse side yoke 109c looks somewhat L-shaped, each side of the transverse side yoke 109c is arranged to face to and spaced apart from a transverse side face (adjacent to the magnetic pole face 105a) of a corresponding permanent magnet 105 with interval. Namely, each transverse side yoke 109c faces to and is spaced apart from transverse side faces of two adjacent permanent magnets 105. The back side yoke 109b of the back side yoke 109B and the back surface of the permanent magnet 105, adjacent to the magnetic pole face 105a, are oppositely disposed with each other and spaced at an interval in the Z direction. Each inner side yoke 109e and a corresponding magnetic pole face 105a of the permanent magnet 105 are oppositely disposed with each other and spaced at an interval in a radial direction. Thus, magnetic flux generated from the magnetic pole face 105a is respectively concentrated on the front side yoke 109a, the back side yoke 109b, the transverse side yokes 109c and the inner side yokes 109e, and is guided onto the magnetic pole faces 105c on the opposite side through the back face yoke 109d.

Moreover, a plurality of first coils 103 are respectively disposed between the magnetic pole face 105a of the permanent magnet 105 and the inner side yoke 109e, and are spaced at intervals with the permanent magnets 105 and the inner side yokes 109e along the radial direction.

As shown in FIG. 5, the first spring components 107 includes a front side first spring component 107A and a back side first spring component 107B which are both formed in plane shapes.

The front side first spring component 107A includes a circular arc-shaped inner side retaining part 107Aa which extends in a surface perpendicular to the Z direction and is cut into two parts, a rectangular outer side retaining part 107Ab whose square corners are cut away, and four wrists 107Ac which are bent in a snaking manner along the radial direction and simultaneously extend in circumferential direction, and connect the inner side retaining part 107Aa with the outer side retaining part 107Ab together. The back side first spring component 107B includes a circular arc-shaped inner side retaining part 107Ba which extends in another surface perpendicular to the Z direction and is cut into four parts, a rectangular outer side retaining part 107Bb whose square corners are cut away, and four wrists 107Bc which are bent in a snaking manner along the radial direction and simultaneously extend in circumferential direction, and connect the inner side retaining part 107Ba with the outer side retaining part 107Bb together. These wrists 107Ac and 107Bc take effects as springs for suspension supporting the carrier bracket 102 on the base 108.

The inner side retaining part 107Aa of the front side first spring component 107A is connected with the front surface front side carrier bracket 102A in the Z direction, and the inner side retaining part 107Ba of the back side first spring component 107B is connected with the back surface of the connecting part 102a of the back side carrier bracket 102B.

Moreover, the outer side retaining part 107Ab of the first spring component 107 is connected with the base 108. Specifically, as shown in FIG. 1 and FIG. 6, the outer side retaining part 107Ab of the front side first spring component 107A is connected with the front surfaces of four front side spacers 112 configured in front of the four permanent magnets 105 respectively, and the outer side retaining part 107Bb of the back side first spring component 107B is connected with the back surfaces of four back side spacers 111 configured at the back of the permanent magnets 105, respectively. Therefore, the carrier bracket 102 is supported to move in the Z direction relative to the base by utilizing the first spring components 107.

Herein, the outer side retaining parts 107Ab and 107Bb of the front side and the back side first spring components 107A and 107B are connected with the base 108 at the position closer to the back of the Z direction than the connection position of the inner side retaining parts 107Aa and 107Ba, and the wrists 107Ac and 107Bc are stretched, namely the carrier bracket is kept in an offset state relying on the first spring components 107. Therefore, preload is applied to the carrier bracket 102 in the −Z direction, namely the direction opposite to the object to be shot, by utilizing the front side and the back side first spring components 107A and 107B. When the first coil 103 is not electrified, the back end 102c of the back side carrier bracket 102B abuts against a limiting part 108c of the base 108 and is supported at the most backward position.

In the lens driving device 100 with image stabilizer function, if the X side coil 104X is electrified, the Lorentz force in the +X direction or the −X direction is generated on the X side coil 104X, so that the lens carrier 101 swings in the +X direction or the −X direction to a balanced position where a restoring force of the second spring component 106 equals to the Lorentz force in the −X direction or the +X direction. Similarly, if the Y side coil 104Y is electrified, the Lorentz force in the +Y direction or the −Y direction is generated on the Y side coil 104Y, so that the lens carrier 101 swings in the +Y direction or the −Y direction to a balanced position where a restoring force of the second spring component 106 equals to the Lorentz force in the −Y direction or the +Y direction. If the X side coil 104X and the Y side coil 104Y are electrified at the same time, the lens carrier 101 can swing in the appropriate X and Y synthesis direction according to the current supplied to the X side coil 104X and the Y side coil 104Y respectively.

Moreover, if the first coil 103 is electrified, the Lorentz force in the +Z direction is generated on the first coil 103, so that the carrier bracket 102 moves forwards (+Z) in the Z direction to a balanced position where a restoring force of the first spring component 107 equals to the Lorentz force in the −Z direction. Therefore, the lens carrier 101 is suspended supported on the carrier bracket 102 and the carrier bracket 102 can move forwards in the Z direction together.

Therefore, the lens driving device 100 with image stabilizer function in the first embodiment of the present invention can enable the carrier bracket 102 supporting the lens carrier 101 to move in the Z direction, and enable the lens loaded on the lens carrier 101 to be focused, and the lens carrier 101 can swing in the X direction or the Y direction to realize image stabilizer function during automatic focusing.

The object-side direction is hereafter referred as a forward direction of the Z axis. In conclusion, the lens driving device 100 with image stabilizer function includes a lens carrier 101 for retaining the unshown lens, a carrier bracket 102, a plurality of permanent magnets 105, at least a first coil 103, a plurality of second coils 104, a base 108, at least one first spring component 107, and a plurality of second spring components 106. Each second spring component 106 extends in the Z direction, one end of the second spring component is connected with the carrier bracket 102, and the other end of the second spring component is connected with the lens carrier 101. The first spring component 107 extends along the surface perpendicular to the Z axis, one end of the first spring component is connected with the carrier bracket 102, and the other end of the first spring component is connected with the base 108. The first coil 103 is wound around the Z axis and disposed on the carrier bracket 102. The second coils 104 are wound in the directions perpendicular to the Z axis, and disposed around the circumferential side of the first coil 103 on the lens carrier 101. On the outer side of the second coil 104, the magnetic pole face 105a of each permanent magnet 105 disposed on the base 108 faces to the inner side, or in other word, faces to the Z axis. The spiral wind surface of the second coil 104 is arranged to face the magnetic pole face 105a of the permanent magnet 105 with spacing therebetween. And the side face adjacent to the winding surface of the first coil 103 faces the magnetic pole face 105a of the permanent magnet 105 with an interval therebetween through a centre opening 104k of the second coil 104. Therefore, the lightweight swing part can be formed. Thus, even though the posture of the camera changes, the second spring components 106 can be with little flexural deformation, thus the off-centering of the lens not needed.

Therefore, the lens driving device with image stabilizer function in the above structure does not need additional components such as the position detecting mechanisms or the offset correcting control circuits, so that miniaturization, low cost and low power consumption can be realized.

The above describes the main components of the lens driving device with image stabilizer function, and then the assembling structure of the lens driving device 100 with image stabilizer function according to the first embodiment of the present invention is described according to FIG. 6.

After several semi-assemblies formed by combining a plurality of components are assembled, single components and the semi-assemblies are assembled in sequence into the lens driving device 100 with image stabilizer function.

Firstly, the first coil 103 is sleeved on the retaining parts 102s of the back side carrier bracket 102B, and the connecting part 102a is connected with the back ends of the four second spring components 106, so that the front surface inner side retaining part 107Ba of the back side first spring component 107B is connected with the back surface of the back side carrier bracket 102B so as to be assembled into a carrier bracket assembly.

A spring pressing strip 113, the front side first spring component 107A, the front side spacers 112 and the permanent magnets 105 are respectively inserted and fixed in the inner side of the front side magnet yoke 109A in the −Z direction in sequence so as to be assembled into a magnet yoke assembly.

Moreover, a terminal 110 is disposed at the X side edge of the base 108, and the back side yoke 109B is disposed on the front surface of the base 108 so as to be assembled into a base assembly. The terminal 110 is connected with an unshown power source outside, and supplies working current to the first coils 103 and the second coils 104.

The above semi-assemblies prepared in advance are assembled together with other single components according to the sequence as described in the following.

Namely, the carrier bracket assembly is disposed on the base assembly, the back side spacer 111 is disposed on the outer side retaining part 107Bb of the back side first spring component 107B which is connected with the carrier bracket assembly, and the outer side retaining part 107Bb and the back side yoke 109B are clamped by the base 108 and the back side spacer 111. Then, the lens carrier 101 is inserted into the inner side of the carrier bracket assembly, so that the front side carrier bracket 102A is disposed in the front of the lens carrier 101, after the front end of the second spring component 106 is connected with the connecting part of the second spring component of the lens carrier 101, so that the front side carrier bracket 102A is connected with the front end of the retaining part 102s of the back side carrier bracket 102B. Then, the second coils 104 are disposed at the retaining part 101c around the outer circumferential side of the first coil 103.

And then, the magnet yoke assembly is covered on these components, the back ends of the permanent magnets 105 are pressed and fixed on the back side spacer from the +Z side, so that the back surface of the inner side retaining part 107Aa of the front side first spring component 107A is connected with the front end face of the front side carrier bracket 102A. The front side magnet yoke 109A is covered on the whole assembled component, thus the efficiency of the magnetic loop for moving the lens and the magnetic loop for swinging the lens can be improved, electromagnetic waves are prevented from emitting to inside and outside of the camera, and the damage or deformation of the component due to the external force is prevented.

Figure 7:
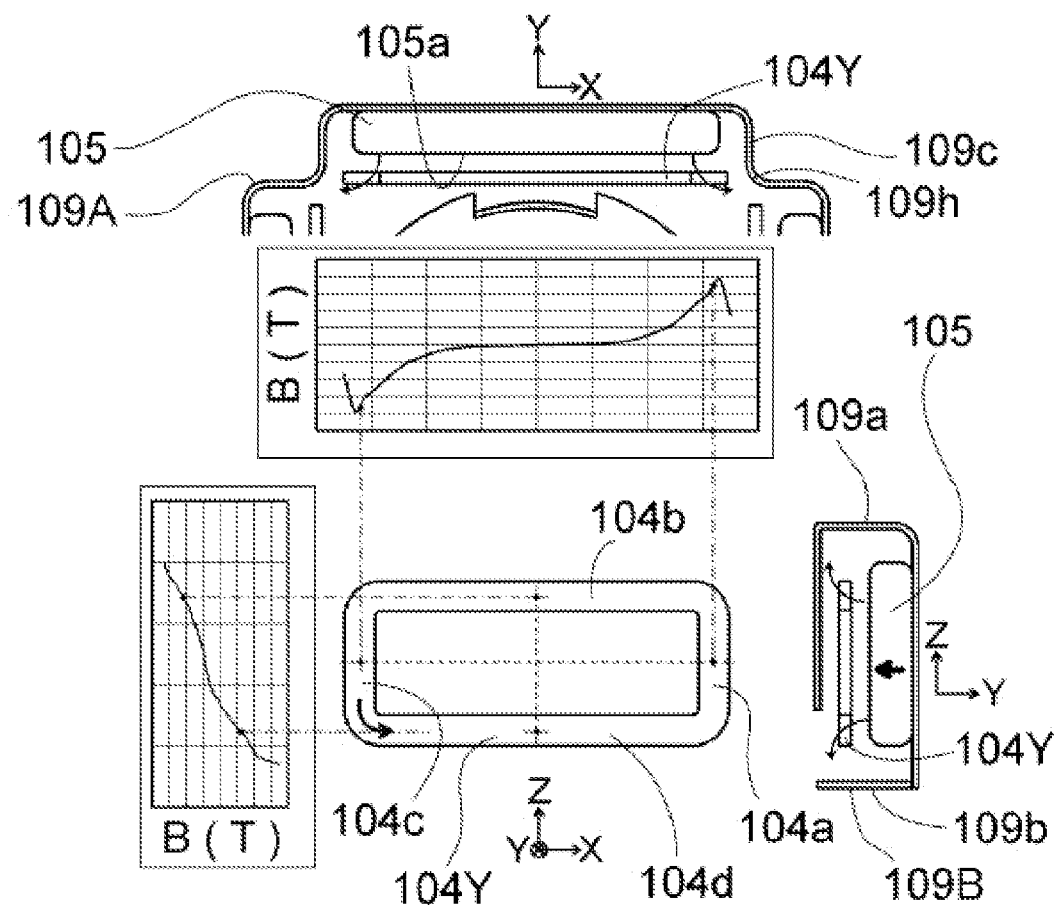
FIG. 7 is a diagram illustrating curves of magnetic flux density applied on the second coil of the lens driving device with image stabilizer function according to the first embodiment.

FIG. 7 is a curve chart of size change of magnetic flux density B(T) on respective central part of the winding edges 104a, 104b, 104c and 104d of the coil applied on the +Y side of the Y side coil 104Y. Magnetic flux in the direction perpendicular to the normal of the magnetic pole face 105a and each winding edge 104a to 104d is respectively applied to each winding edge 104a to 104d in the Y side coil 104Y. When the magnetic pole face 105a of the permanent magnet 105 is taken as N pole, the magnetic flux in the +X direction is applied to the winding edge 104a, the magnetic flux in the +Z direction is applied to the winding edge 104b, the magnetic flux in the −X direction is applied to the winding edge 104c, and the magnetic flux in the −Z direction is applied to the winding edge 104d, thus the second coils 104 can swing and work efficiently. Thus, for example, when the Y side coil 104Y on the +Y side is electrified in the anticlockwise Y direction and the Y side coil 104Y on the −Y side is electrified in the anticlockwise Y direction, powerful Lorentz force in the +Y direction is respectively generated on the Y side coils 104Y on the +Y side and the −Y side. Therefore, the lightweight swing part including the unshown lens, the lens carrier 101 and the second coils 104 can swing efficiently in the +Y direction. Moreover, if the voltaic directions are reversed respectively, the swing part also can swing efficiently in the −Y direction.

Similarly, if the X side coil 104X is electrified, the swing part also can swing efficiently in the +X direction or the −X direction based on the voltaic direction. Moreover, if the X side and the Y side coils 104X and 104Y are electrified at the same time, the swing part also can swing efficiently in the appropriate X and Y synthesis direction according to the size of electric charge quantity for the X side and the Y side coils 104X and 104Y.

However, if the magnet yoke 109 is disposed on the base 108, then the running efficiency of the second coils 104 also can be improved further without increasing the weight of the swing part. Namely, the magnetic flux density B generated on the magnetic pole face 105a of the permanent magnet 105 and applied on the second coils 104 can be improved by utilizing the front side yoke 109a and the transverse side yokes 109c of the front side magnet yoke 109A and the back side yoke 109b of the back side yoke 109B, thus the Lorentz force generated by the electrified second coils 104 can be enhanced, so that the operation with high swinging efficiency can be performed.

Moreover, if the inner side yoke 109e is disposed inside the magnet yoke 109 and inserted in the inner side of the first coil 103, the magnetic flux density B generated on the magnetic pole face 105a of the permanent magnet 105 and applied on the first coil 103 can be improved, thus the Lorentz force generated by the electrified first coil 103 can be enhanced, and the running efficiency of the first coil 103, namely the automatic focusing driving efficiency, of the first coil 103 can be improved.

As mentioned above, the lens driving device 100 with image stabilizer function in the first embodiment of the present invention includes the lightweight swing part, thus the flexural deformation of the second spring components 106 also can be reduced even if the posture of the camera changes, and the off-centering of the lens can be reduced.

Moreover, the magnetic pole face 105a of each permanent magnet 105 is arranged to face the spiral wind surface of each second coil 104 with spacing therebetween, which enables to improve the magnetic flux density B applied on the second coils 104, and enables the second coils 104 to swing and operate efficiently. Moreover, by utilizing the second spring components 106 with great spring coefficient, the flexural deformation of the second spring components 106 can be reduced.

Moreover, the front side, the transverse side and the back side yokes 109a, 109c and 109b disposed on the base 108 are configured on the winding circumferential side of the second coil 104, thus the magnetic flux density B applied on the second coils 104 also can be increased further without increasing the weight of the swing part, and the swinging thrust force generated by the second coils 104 is increased further. Moreover, the spring coefficient of the second spring components 106 can be improved further, thus the flexural deformation of the second spring components 106 can be reduced further.

Therefore, the present invention can provide a lens driving device 100 with image stabilizer function capable of reducing the off-centering caused by posture change of the camera, and the additional components such as the position detecting mechanisms or offset correcting control circuits are not needed, thus the minimization, low cost and low power consumption can be realized.

Moreover, the inner side yokes 109*e* are disposed on the inner circumferential side of the first coil 103, which enable to increase the magnetic flux applied on the first coil 103, and to improve the moving thrust force generated by the first coil 103, namely the automatic focusing driving efficiency. Therefore, focusing driving can be performed with low power, and low power consumption can be realized.

Figure 8:
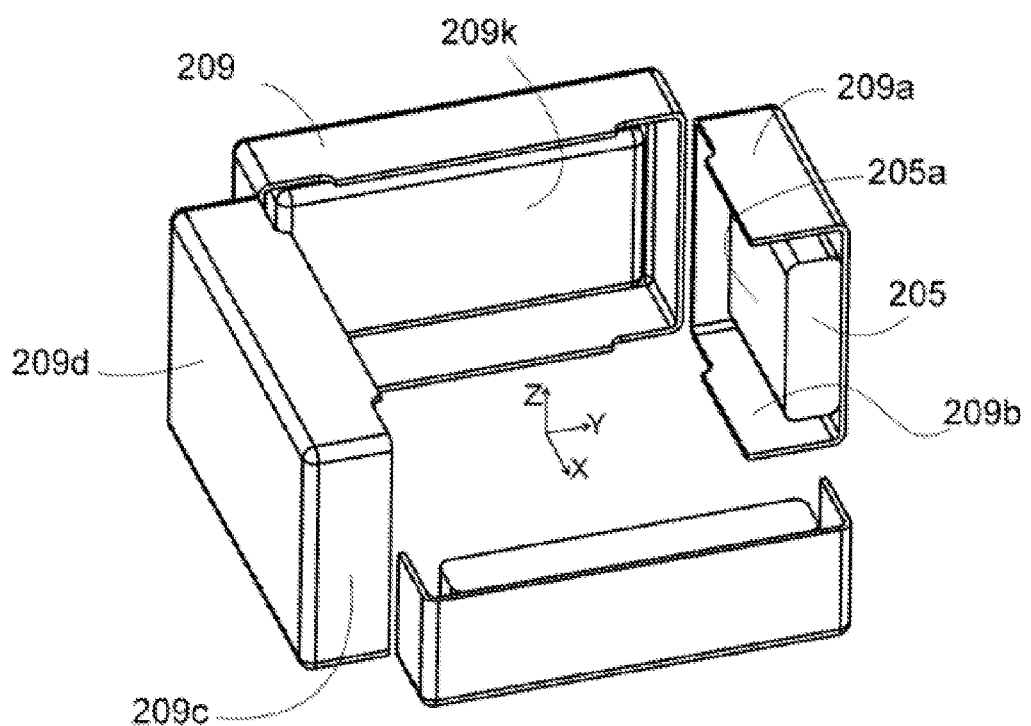
FIG. 8 is a perspective view of another magnetic loop structure in the lens driving device with image stabilizer function according to the first embodiment.
Figure 9:
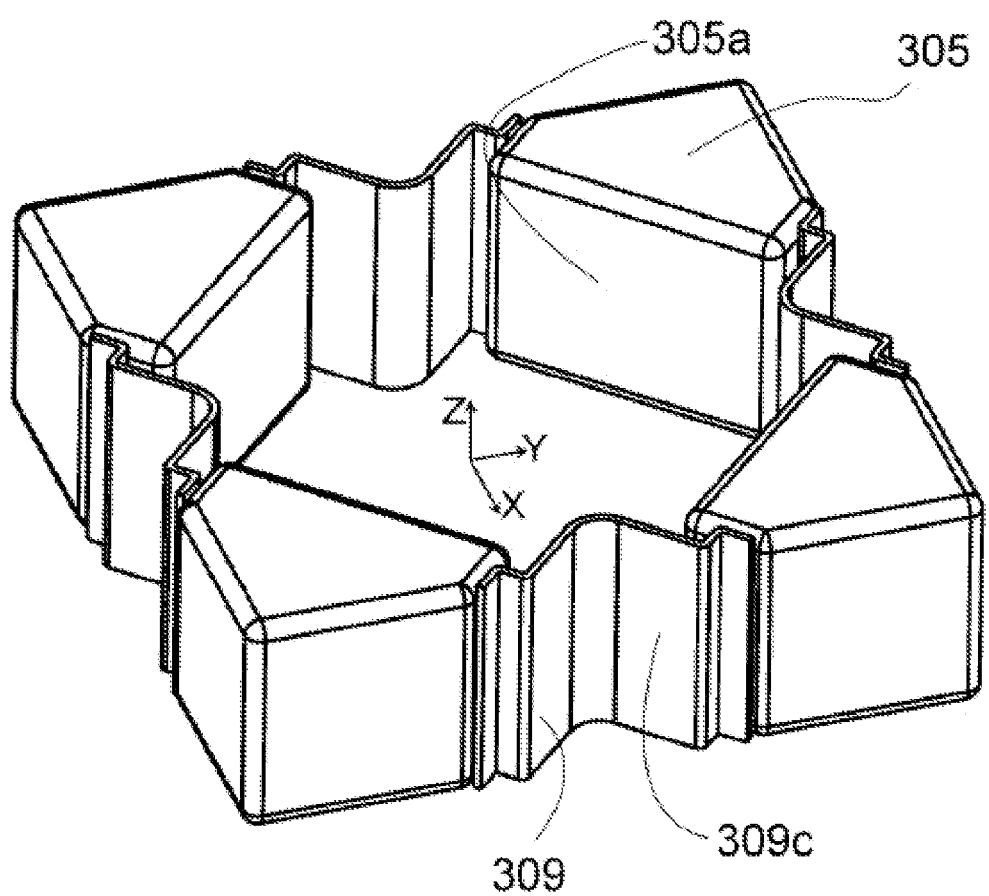
FIG. 9 is a perspective view of further another magnetic loop structure in the lens driving device with image stabilizer function according to the first embodiment.

Moreover, the shape of the magnet yoke is not limited to this, and it also can be formed shapes shown in FIG. 8 and FIG. 9 so as to replace the magnetic loop structure as shown in FIG. 4. For the purpose to easily observe the position relationship between the magnet yoke 209 in FIG. 8 and the permanent magnets 205 positioned at the inner wall side, the lens driving device is partly cut and shown.

The magnet yokes 209 as shown in FIG. 8 are respectively disposed to receive four permanent magnets 205, and formed into a rectangular box with an opening on one side. Five faces, except the magnetic pole face 205*a*, of the permanent magnet 205 are wrapped by the magnet yokes 209, so that the opening part 209*k* faces to the inner side, and the magnet yokes 209 and the permanent magnets 205 are circularly disposed around the axis parallel to the Z axis at 90 degrees intervals. The front side yoke 209*a* is formed in the forward direction of the Z axis, the back side yoke 209*b* is formed in the backward direction of the Z axis, the transverse side yokes 209*c* are formed on two transverse sides of the permanent magnet 205. The back face yoke 209*d* is formed in the backward direction of the permanent magnet 205, faces to the opening part 209*k*, and connecting to the front side yoke 209*a*, the back side yoke 209*b*, and the transverse side yokes 209*c*. Moreover, the front side yoke 209*a*, the back side yoke 209*b* and the transverse side yokes 209*c* are respectively spaced apart from the side faces, adjacent to the magnetic pole face 205*a*, of the permanent magnet 205 and oppositely disposed mutually. Thus, the swinging thrust force also can be enhanced by efficiently applying the magnetic flux onto the second coils 104 through the formed magnetic loop structure, by utilizing the second spring components 106 with great spring coefficient (or spring rate), the swinging thrust force of the second coils 104 is enhanced. Therefore, the device is corresponding to the lightweight technology of the swing part, and the lens off-centering change caused by the posture change of the camera is reduced. Off-centering correcting processing is not needed, so the additional components such as the position detecting mechanisms or the offset correcting control circuits can be omitted, thus the minimization, low cost and low power consumption can be realized.

Moreover, the pentagonal prism-shaped permanent magnets 305 as shown in FIG. 9 are circularly configured around the axis parallel to the Z axis, the face facing to the inner diameter side is taken as the magnetic pole face 305*a*, and the transverse side yokes 309*c* of the V-shaped magnet yoke 309 are mutually clamped between each permanent magnet 305, the resulting magnetic loop structure also can swing efficiently. Moreover, the permanent magnet 305 is not limited to the shape of pentagonal prim, and also can be in the shape of triangular prism or other polygon prisms.

As mentioned above, the lens driving device 100 with image stabilizer function of the present invention can reduce the weight of the swing part, and enhance the swinging thrust force, so by utilizing the second spring components 106 with great spring coefficient, the lens off-centering caused by the posture change of the camera also can be reduced without offset correction. Therefore, the additional components such as the position detecting mechanisms or the offset correcting control circuits do not need to be loaded, and the minimization, low device cost and low power consumption also can be realized.

Figure 10A:
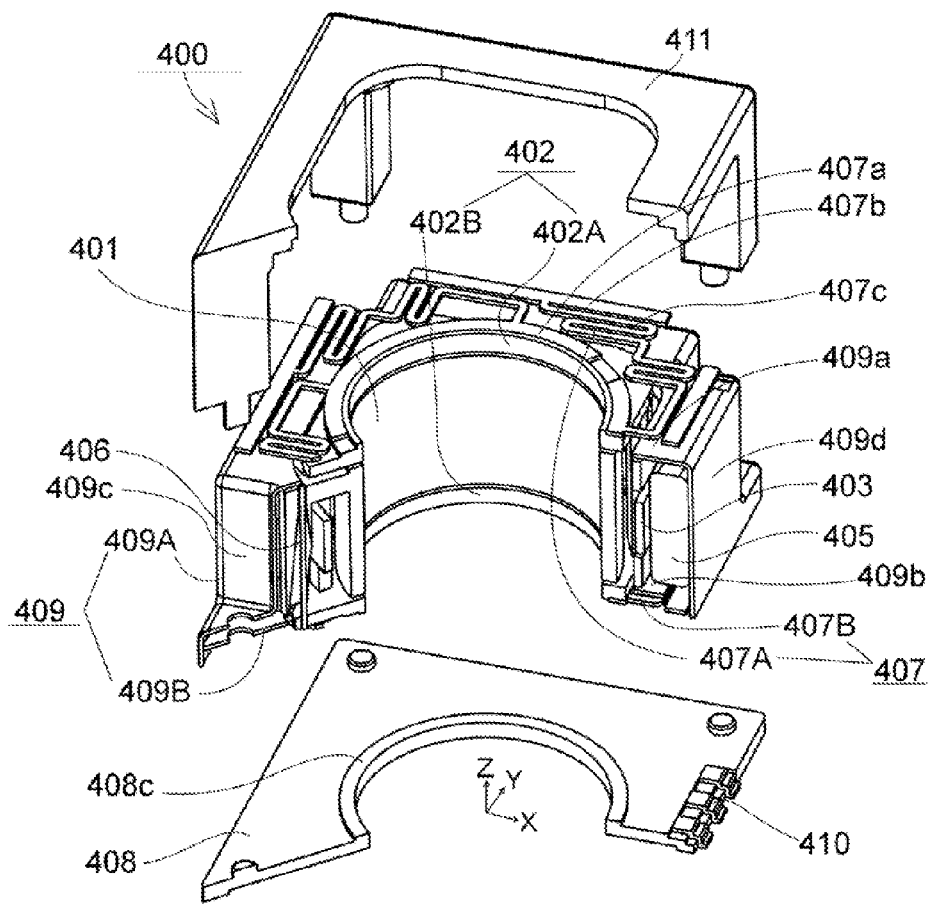
FIG. 10A is an exploded cross-section view of another structure of the lens driving device with image stabilizer function according to the first embodiment of the present invention.
Figure 10B:
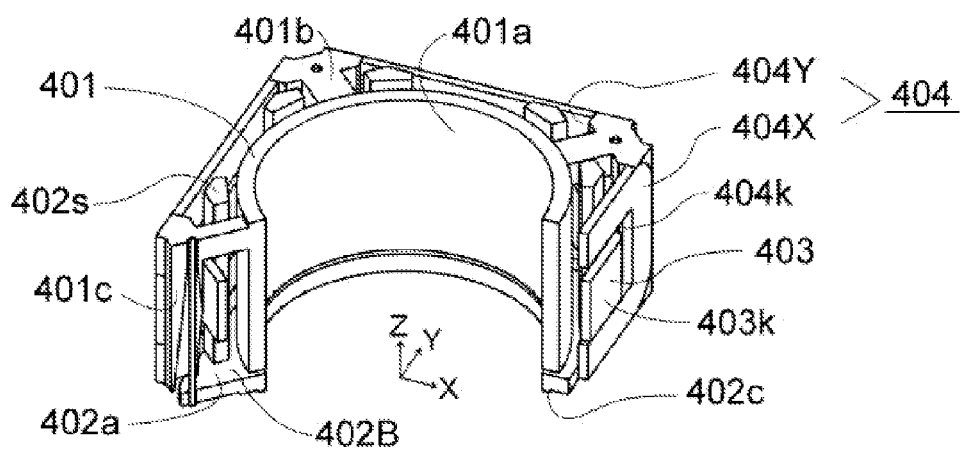
FIG. 10B is a cutoff view of a lens carrier of the lens driving device of FIG. 10A.

In the first embodiment, the structure capable of swinging the lens in X direction and Y direction is described, that the second spring components 106 is configured on the inner circumferential side of the winding edge of the first coil 103, and the lens carrier 101 is suspended supported on the carrier bracket 102, but as shown in partly cut-off section view of the FIGS. 10A and 10B, the lens driving device 400 with image stabilizer function can also realize its function by configuring the second spring components 406 on the outer circumferential side of the winding edge of the first coil 403.

The condition is also similar to the first embodiment, the lens carrier 401 for retaining the lens is supported by the carrier bracket 402 so that the lens driving device can swing in the X direction and the Y direction, and the carrier bracket 402 is supported by the base 408 so as to move in the Z direction. The carrier bracket 402 includes a front side carrier bracket 402A and a back side carrier bracket 402B, one end of the second spring component 406 extending along the Z direction is connected with the carrier bracket 402, the other end is connected with the lens carrier 401, and the lens carrier 401 can swing in the X direction and the Y direction. Moreover, the inner circumferential side of the first spring component 407 extending along the direction perpendicular to the Z direction is connected with the carrier bracket 402, the outer circumferential side thereof is connected with the base 408, and the carrier bracket 402 can move in the Z direction. Therefore, the lens carrier 401 can swing in the X direction and the Y direction no matter where the position of the carrier bracket 402 moving along the Z direction during automatic focusing is.

The lens carrier 401 includes a barrel-shaped lens retaining part 401*a* defining an opening in the Z direction, a connecting part 401*b* for connecting with the second spring component which is projected outwards radially from four parts at diagonal positions, close to the front surface of the lens retaining part 401*a*, in the Z direction, and a retaining part 401*c* for holding the second coil which extends towards the Z direction from the external front end of the connecting part 401*b* for connecting the second spring component. The carrier bracket 402 includes the front side carrier bracket 402A and the back side carrier bracket 402B. The front side carrier bracket 402A is a square plate-shaped component opening in the Z direction. Moreover, the back side carrier bracket 402B includes a square tubular connecting part 402*a* for connecting the second spring component with an opened central part in the Z direction, and eight bar-shaped retaining parts 402*s* for retaining the first coil which extend forwards the Z direction from the inner side of the corner of the connecting part 402*a* and configured around the lens retaining part 401*a* at preset intervals.

The retaining parts 402*s* extend to the front of the connecting part 401*b* in the Z direction, and each is disposed between two adjacent connecting parts 401*b*. Moreover, the front end of the retaining part 402*s* of the first coil is connected with the back end face of the front side carrier bracket 402A, and the lens carriers 401 are clamped at an interval in the Z direction by the carrier bracket 402 so as to be suspended supported to swing.

At the back of the Z direction of the connecting part 401*b*, namely at the middle of two retaining parts 402*s*, the back ends of four second spring components 406 extending along the Z direction are connected with the connecting part 402*a* of the second spring components of the carrier bracket 402, and the front end of the second spring component 406 is connected with the connecting part 401*b* of the lens carrier 401. Thus, the back end of the lens retaining part 401*a* in the lens carrier 401 and the front surface of the connecting part 402*a* for connecting the second spring component of the back side carrier bracket 402B are oppositely disposed with each other and spaced at an interval in the Z direction; and the front surface connecting part 401*b* is arranged to face the back surface of the front side carrier bracket 402A with spacing in the Z direction.

As a result, the lens carrier 402 is suspended supported by the carrier bracket 401, so it can swing in the X direction and the Y direction.

Figure 11:
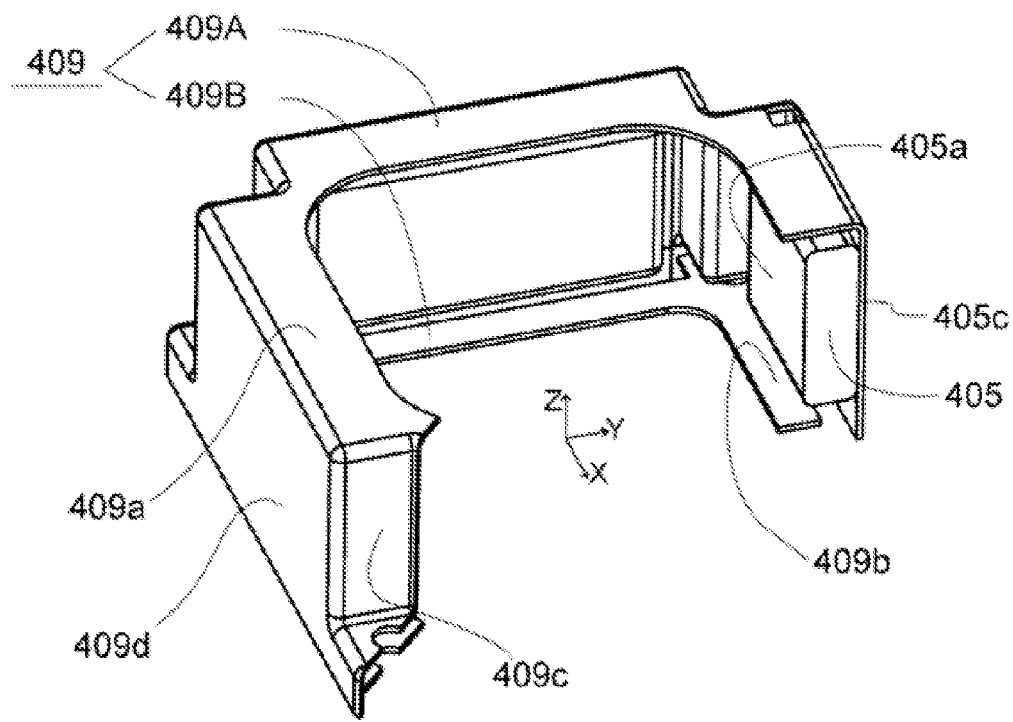
FIG. 11 is a cutoff view of another magnetic loop structure of the lens driving device with image stabilizer function according to the first embodiment.

As shown in FIGS. 10A, 10B and 11, four permanent magnets 405 are respectively formed in rectangular shapes and circularly configured around an axis parallel to the Z axis, and each permanent magnet is provided with a magnetic pole face 405*a* on the inner circumferential side. Moreover, the second coils 404 include two X side coils 104X wound around the X axis and two Y side coils 104Y wound around the Y axis, the X side coils 104X and the Y side coils 104Y are in pairs respectively, of which the spiral wind surfaces are disposed and spaced apart from the magnetic pole faces 405*a* of the permanent magnets 404. Moreover, the second coils 404 are retained by adhering the retaining parts 401*c* of the lens carrier 401 to the edges of the X side coils 404X and the Y side coils 404Y respectively parallel to the Z axis.

Thus, the lightweight swing part includes the lens carrier 401, the second coils 404 and the unshown lens.

The first coil 403 is wound around the Z axis and formed into an octagonal frame shape, and is configured on the inner sides of the four second spring components 406 which are connected with the four permanent magnets 405 and the back side carrier bracket 402B respectively. The wound side faces 403*k* are protruded towards the outer side from the centre openings 404*k* of the X side coils 404X and the Y side coils 404Y, and are oppositely disposed and spaced apart from the magnetic pole faces 405*a* of the permanent magnets 405. With such a configuration, the first coil 403 is retained on the outer circumferential portions of the eight retaining parts 402*s* on the back carrier bracket 402B. Moreover, the terminal 410 disposed on the base 408 is utilized to supply required current to the first coil 403, the X side coils 404X and the Y side coils 404Y.

As mentioned above, the lightweight swing part only includes the unshown lens, the lens carrier 401 and the second coils 404.

The rectangular box-shaped magnet yoke 409 with an opened central part in the Z direction is disposed on the outer side of the permanent magnets 405. The magnet yoke 409 includes the front side magnet yoke 409A and the back side yoke 409B which are respectively formed by stretching or punching strong magnetic sheet material composed of soft iron and the like. The front side magnet yoke 409A is integrally formed with the front side yoke 409*a*, the transverse side yokes 409*c* and the back face yoke 409*d*, and the back magnet yoke 409B includes the back side yoke 409*b* separately formed with the front side magnet yoke 409A.

The front side yoke 409*a* extends along the surface perpendicular to the Z axis in front of the permanent magnet 405 so as to form the plate surface having an approximately square centre opening. The side face corners of the magnet yoke 409 are dented in a state that the back part remains in the Z direction, and the transverse side yokes 409*c* are protruded towards the radial inner side in the narrow gaps among each circularly configured permanent magnet 405.

The back side yoke 409*b* of the back side yoke 409B extends along the surface perpendicular to the Z direction at the back of the permanent magnet 405 so as to form the plate surface having the square opening.

The front side yoke 409*a* is arranged to face to and spaced apart from the front side face, adjacent to the magnetic pole face 405*a*, of the permanent magnet 405 in the Z direction. The transverse side yokes 409*c* is arranged to face to and spaced apart from the two transverse side faces, adjacent to the magnetic pole face 405*a*, of the permanent magnet 405 in the transverse direction; and the back side yoke 409*b* is arranged to face to and spaced apart from the back surface, adjacent to the magnetic pole face 405*a*, of the permanent magnet 405 in the Z direction. Thus, the magnetic flux generated from the magnetic pole face 405*a* is converged on the front side yoke 409*a*, the back side yoke 409*b* and the transverse side yokes 409*c*, and is guided onto the magnetic pole face 405*c* on the opposite side through the back face yoke 409*d*.

As shown in FIGS. 10A and 10B, the first spring components 407 are similar to the first embodiment, and include the front side first spring component 407A and the back side first spring component 407B which are formed into plate-like shape.

The front side first spring component 407A and the main back side first spring component 407B are formed in the same shape, and respectively comprise a circular arc-shaped inner side retaining part 407*a* which extends along the direction perpendicular to the Z direction and is cut into two parts, a rectangular outer side retaining part 407*b* whose square frame corners are cut away, and four wrists 407*c* which are bent in a snaking manner along the radial direction and simultaneously extend in circumferential direction, and connect the inner side retaining part 407Aa with the outer side retaining part 407Ab together. These wrists 407*c* take effects as springs for suspended supporting the carrier bracket 402 on the base 408.

The inner side retaining part 407*a* of the front side first spring component 407A is connected with the upper portion of the front side carrier bracket 402A, and the inner side retaining part 407*a* of the back side first spring component 407B is connected with the lower portion of the connecting part 402*a* of the second spring component of the back side carrier bracket 402B. The outer side retaining part 407*b* of the front side first spring component 407 is connected with the front surface of the front side yoke 409*a* in the front side magnet yoke 409A, and is clamped by the front side yoke 409*a* and a cover 411. Moreover, the outer side retaining part 407*b* of the back side first spring component 407B is connected with the front surface of the base 408, and is clamped by the base 408 and the back side yoke 409B. Therefore, the carrier bracket 402 is supported to move in the Z direction relative to the base 408 by the first spring component 407.

The outer side retaining part 407*b* of the front side and the back side first spring components 407A and 407B are connected with the base 408 at the position closer to the back of the Z direction than the inner side retaining part 407*a*, namely at an offset state. Therefore, preload is applied to the carrier bracket 402 in the −Z direction, namely the direction opposite to the object to be shot, by utilizing the front side and the back side first spring components 407A and 407B, and when the first coil 403 is not electrified, the back end 402*c* of the back side carrier bracket 402B abuts against the limiting part 408*c* of the base 408 and is retained at the most backward position.

For the lens driving device with image stabilizer function 400 in the above structure, if the X side coil 404X is electrified, the Lorentz force in the +X direction or the −X direction is generated on the X side coil 404X, while the lens carrier 401 swings in the +X direction or the −X direction to a balanced position where a restoring force of the second spring components 406 equals to the Lorentz force in the −X direction or the +X direction. Similarly, if the Y side coil 404Y is electrified, the Lorentz force in the +X direction or the −X direction is generated on the Y side coil 404Y for swinging, and the lens carrier 401 swings in the +X direction or the −X direction to a balanced position where a restoring force of the second spring components 406 equals to the Lorentz force in the −X direction or the +X direction. Moreover, if the X side coil 404X and the Y side coil 404Y are electrified at the same time, the lens carrier 401 can swing in the appropriate X and Y synthesis direction according to the size of current supplied to the X side coil 404X and the Y side coil 404Y respectively.

Moreover, if the first coil 403 is electrified, the Lorentz force in the +Z direction is generated on the first coil 403, so that the carrier bracket 402 moves forwards in the Z direction to a balanced position where a restoring force of the first spring component 407 equals to the Lorentz force in the −Z direction. Therefore, the lens carrier 401 suspended supported by the carrier bracket 402 and the carrier bracket 402 can move forwards in the Z direction together.

The lens driving device with image stabilizer function 400 can enable the carrier bracket 402 supporting the lens carrier 401 to move in the Z direction, and enable the lens loaded on the lens carrier 401 to focus; and the lens carrier 401 can swing in the X direction or the Y direction to realize the image stabilizer function during automatic focusing.

Thus, the lightweight swing part also can be formed in the lens driving device 400 with image stabilizer function, and each winding edge of the second coils 404 under the effect of the magnetic flux generates powerful Lorentz force, thus the flexural deformation of the second spring components 406 can be reduced even if the posture of the camera changes, and the lens off-centering can be reduced. Therefore, the additional components such as the position detecting mechanisms or the offset correcting control circuit do not need to be loaded, and the minimization, low cost and low power consumption also can be realized.

Embodiment II

Figure 12:
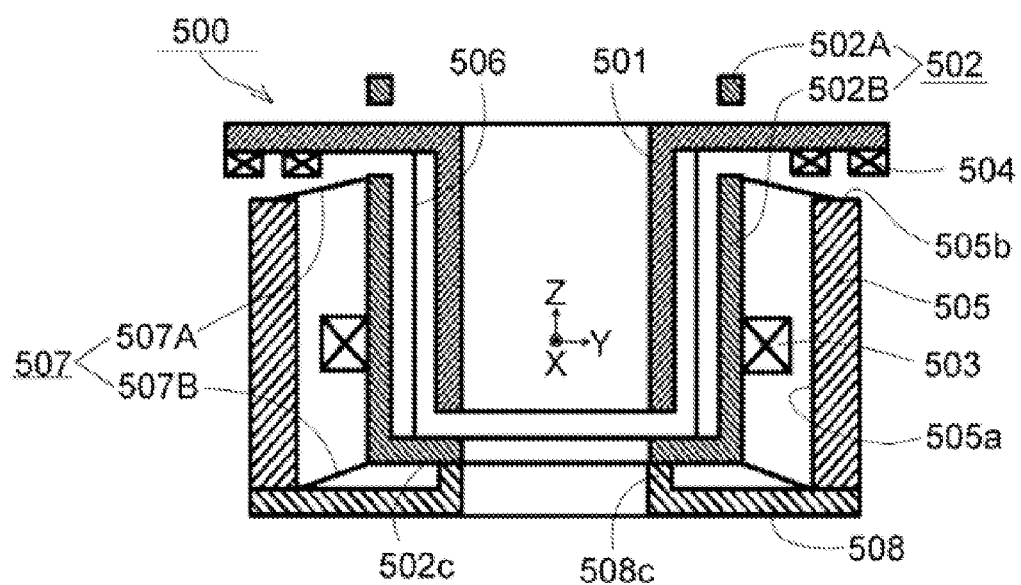
FIG. 12 is a longitudinal cross-section view of a lens driving device with image stabilizer function according to a second embodiment of the present invention.
Figure 13:
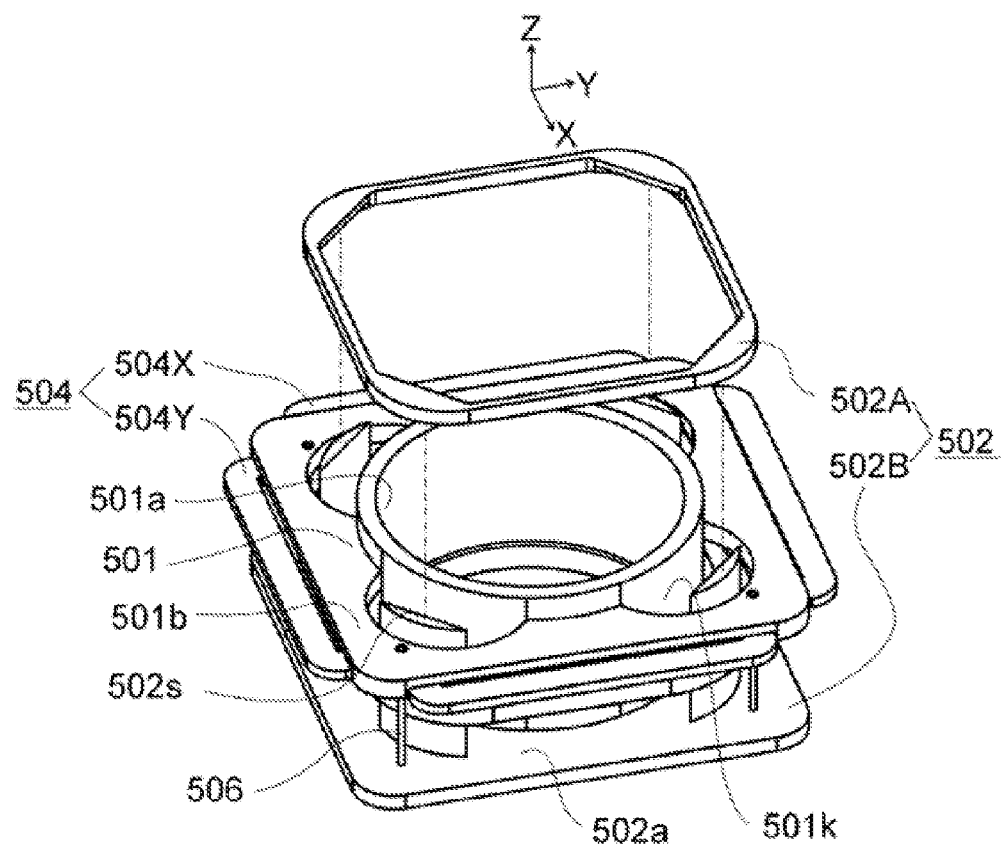
FIG. 13 is an exploded view of a main part of a swing suspension of the lens driving device with image stabilizer function according to the second embodiment.
Figure 14:
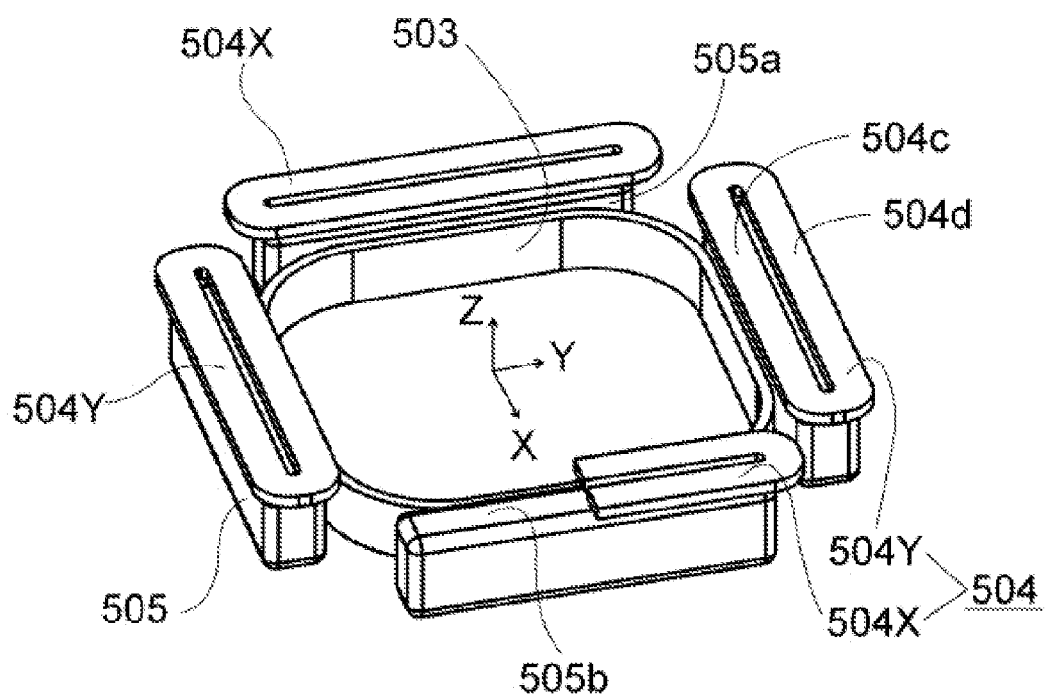
FIG. 14 is a perspective view of permanent magnets, a first coil and second coils in the lens driving device with image stabilizer function according to the second embodiment.
Figure 16:
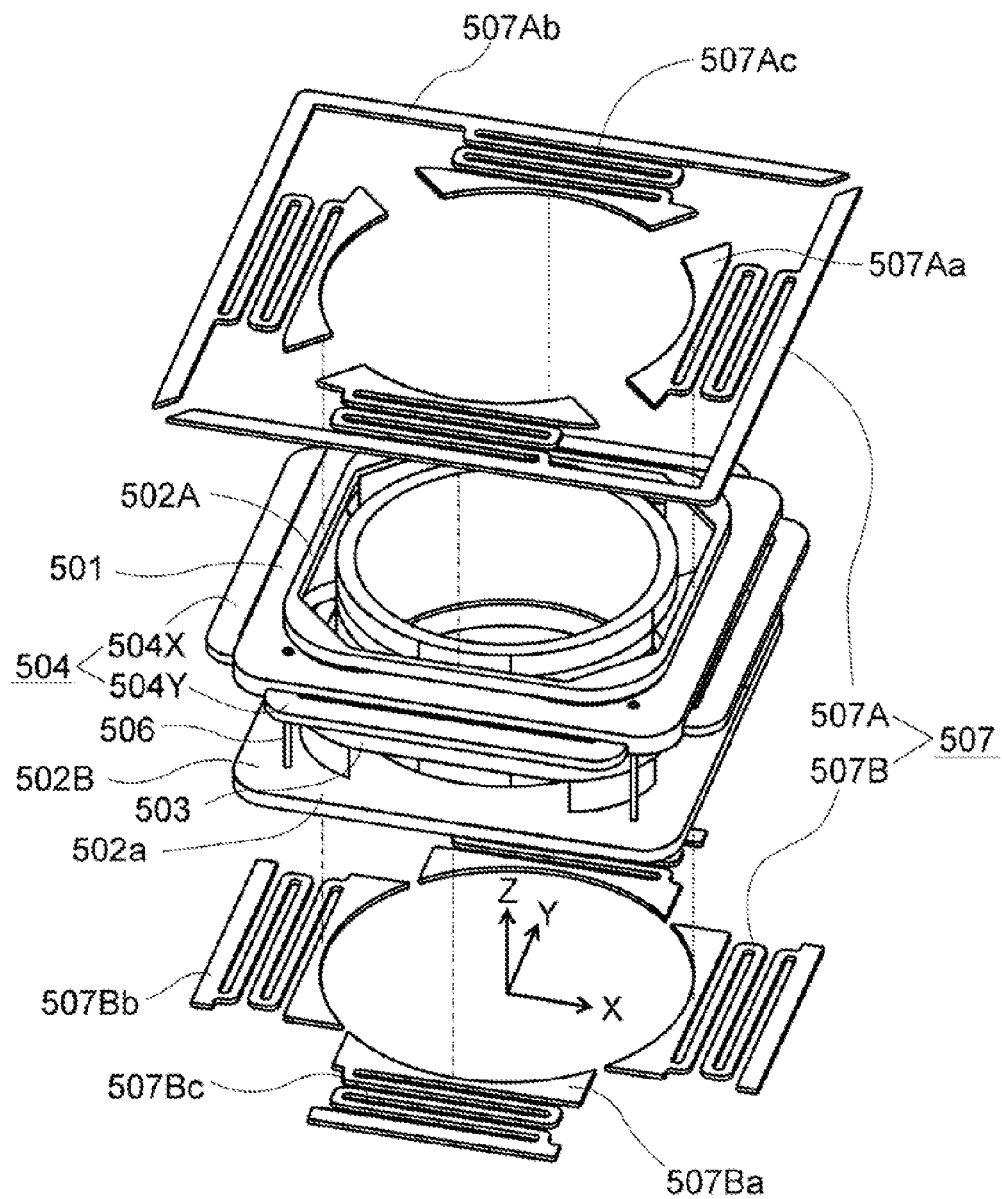
FIG. 16 is an exploded view of a suspension including a first spring component in the lens driving device with image stabilizer function according to the second embodiment.
Figure 17:
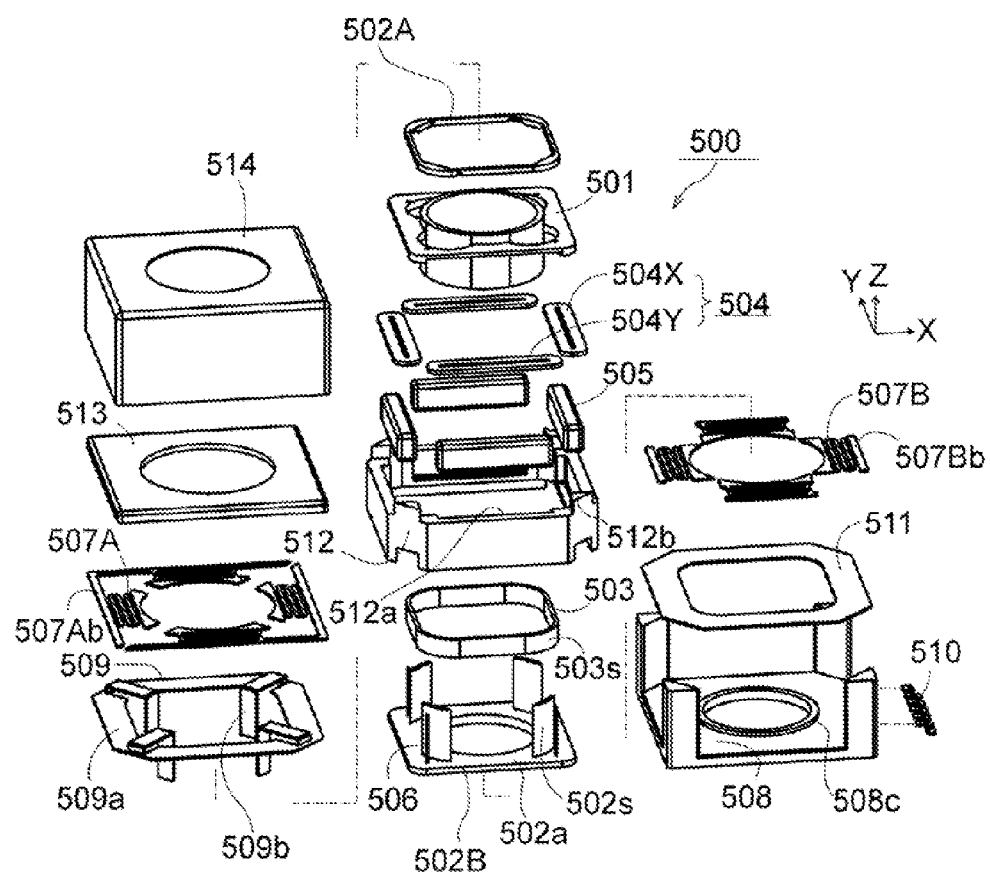
FIG. 17 is a decomposition perspective view of the lens driving device with image stabilizer function according to the second embodiment.

FIG. 12 is a longitudinal cross-section view of a lens driving device 500 with image stabilizer function according to the second embodiment of the present invention. FIG. 13 is a perspective view of a main part of a swing suspension of the lens driving device with image stabilizer function according to the second embodiment, and FIG. 14 is a perspective view of a main part of position relationship among the permanent magnet, the first coil for moving the lens and the second coils for swinging the lens. FIG. 15 is a perspective view of a magnetic loop utilizing the permanent magnet and the magnet yoke. FIG. 16 is an exploded view of the suspension utilizing the first spring component. FIG. 17 is an integral decomposition perspective view of the lens driving device 500 with image stabilizer function according to the second embodiment of the present invention. Moreover, FIG. 14 is shown through section view by partly cutting the second coil 504 for the purpose that the front side face 505b of the permanent magnet 505 is easily shown.

As shown in FIG. 12, the lens carrier 501 for retaining the unshown lens is supported by the carrier bracket 502 so as to swing in the X direction and the Y direction, and the carrier bracket 502 is supported by the base 508 so as to move in the Z direction.

The carrier bracket 502 includes a front side carrier bracket 502A and a back side carrier bracket 502B, one end of the second spring component 506 extending along the Z direction is connected with the carrier bracket 502, the other end is connected with the lens carrier 501, and the lens carrier 501 can swing in the X direction and the Y direction. Moreover, the inner circumferential side of the first spring component 507 extending along a direction perpendicular to the Z direction is connected with the carrier bracket 502, the outer circumferential side thereof is connected with the base 508, and the carrier bracket 502 can move in the Z direction. According to the diagram, it is clear that the lens carrier 502 can swing in the X direction and the Y direction no matter where the position of the lens carrier 501 moving along the Z direction for auto focus is.

As shown in FIG. 13, the lens carrier 501 includes a barrel-shaped lens retaining part 501a with an opening in the Z direction, and a square platelike retaining part 501b for retaining the second coils which is protruded towards from the outside wall of the lens retaining part 501a, retaining part 501b is close to the upper end of the lens retaining part 501a. The carrier bracket 502 includes the front side carrier bracket 502A and the back side carrier bracket 502B. The front side carrier bracket 502A is a square frame-shaped component with an opening in the Z direction. The back side carrier bracket 502B includes a square tubular connecting part 502a for connecting with the second spring component with an opening at the central part in the Z direction, and four rectangular retaining parts 502s for retaining the first coil, which extend forwards in the Z direction from the corner inner side of the connecting part 502a and are configured around the lens retaining part 501a at equal intervals.

The retaining part 501b of the lens carrier 501 defines four through holes 501k in the way the four retaining parts 501b extend in the Z direction, and part of each retaining part 501b protrudes out through the hole 501k, while the edges defining the holes 501k are not attached to the inner circumferential face of the retaining parts 501b. Moreover, the front side of the retaining part 502s is connected with the back end face of the front side carrier bracket 502A, and the lens carrier 501 is partitioned and clamped with spacing in the Z direction by the carrier bracket 502 and suspended supported to swing.

On the outer side of the retaining part 502s, the back ends of the four second spring components 506 extending along the Z direction are connected with the connecting part 502a of the carrier bracket 502, and the front end of the second spring components 506 are connected with the retaining part 501b of the lens carrier 501. Thus, the back end of the lens retaining part 501a in the lens carrier 501 and the front surface of the connecting part 502a of the back side carrier bracket 502B are oppositely disposed with each other and spaced at an interval in the Z direction; and the front surface connecting part 501b for connecting with the second spring component and the back surface of the front carrier bracket 502A are oppositely disposed with each other and spaced at an interval in the Z direction.

As a result, the lens carrier 501 is suspended supported by the carrier bracket 502 and can swing in the X direction and the Y direction.

As shown in FIG. 12 and FIG. 14, four permanent magnets 505 are respectively formed in rectangular shapes and circularly configured around an axis parallel to the Z axis, and the magnetic pole face 505a is configured facing to the inner peripheral side. Two pairs of second coils 504 wound around axises parallel to the Z axis, namely the X side coils 504X and the Y side coils 504Y, are configured in front of the permanent magnet 505, and the spiral wind surfaces of the second coils 504 and the front side face adjacent to the magnetic pole face 505a of the permanent magnet 505 on the +Z side are oppositely disposed with each other and spaced at an interval. The inner side winding edge 504c and the outer side winding edge 504d parallel to each other of the X side coils 504X and the Y side coils 504Y respectively extend along two long edges of the front side face 505b of the permanent magnet 505, and the X side coils 504X and the Y side coils 504Y are formed into a track shape with two sealed ends. Therefore, the second coils 504 are disposed on the back surface of the retaining part 501b of the lens carrier 501 in the Z direction.

Thus, the lightweight swing part includes the lens carrier 501, the second coils 504 and the unshown lens.

Moreover, in this embodiment, a pair of X side coils 504X and a pair of Y side coils 504Y (four second coils in total) are taken as the second coils 504, but also can be not limited to this, various deformation can be carried out according to various embodiments, for example, any coils (in single direction) of the X side coils 504X and the Y side coils 504Y are utilized for swinging operation, or just unpaired single side coils are utilized for swinging operation.

Moreover, the first coil 503 is wound around the Z axis and formed into a square frame shape, and is configured on the inner sides of the four permanent magnets 505, and the side surface adjacent to the spiral wind surface of the first coil 503 and the magnetic pole face 505a are oppositely disposed and spaced at an interval. The first coil 503 is retained on the outer circumferential parts of the four retaining parts 502s of the first coil on the back side carrier bracket 502B.

Figure 15A:
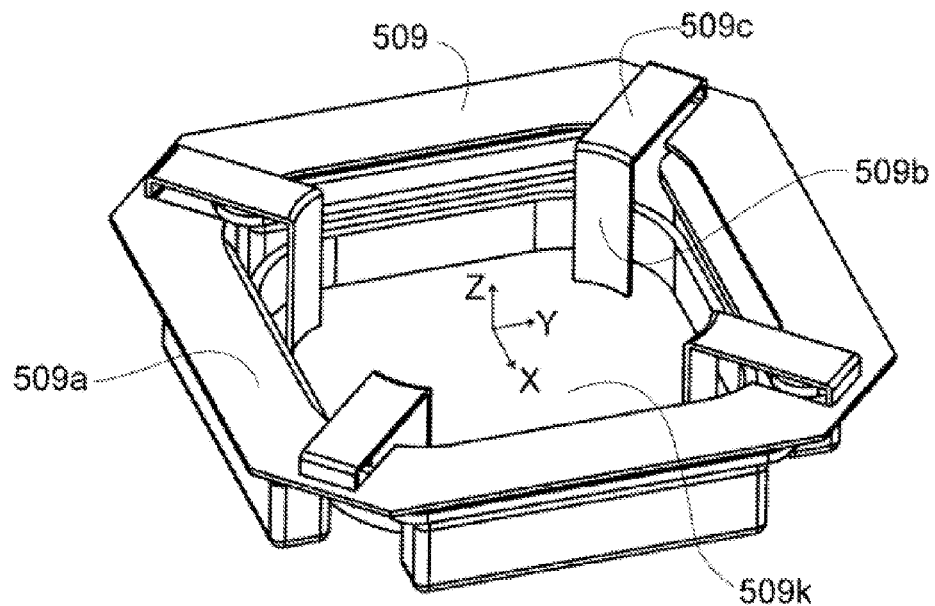
FIG. 15A is a perspective view of a magnetic loop structure in the lens driving device with image stabilizer function according to the second embodiment.
Figure 15B:
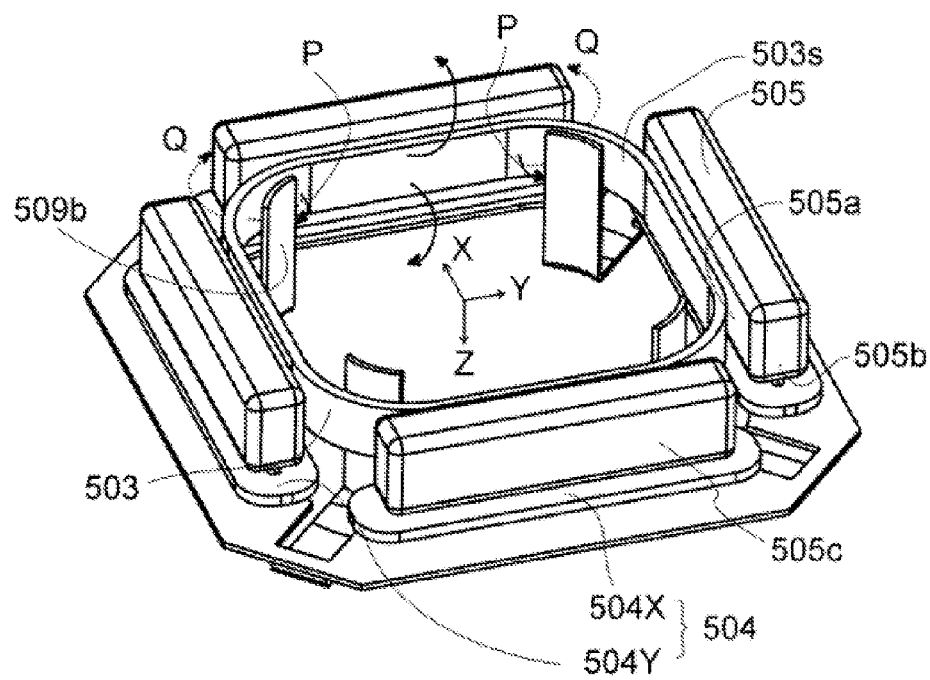
FIG. 15B is a perspective view of the magnetic loop structure of FIG. 15A taking from another view.

FIGS. 15A and 15B are perspective views of a main part according to the structure of the magnet yoke 509, and FIG. 15A is a perspective view viewed from the front, and FIG. 15B is a perspective view viewed from the rear. The magnet yoke 509 is a component integrally formed by stretching strong magnetic sheet material composed of soft iron and the like, and includes a square frame-shaped front side yoke 509a which extends along the direction perpendicular to the Z direction and is provided with a square opening part 509k at the center, a rectangular middle magnet yoke 509b which extends along the Z direction at four corners of the opening part 509k, and guiding parts 509c which extend inwards along the radial direction after being protruded forwards in the Z direction on the outer sides of the four corners of the front side yoke 509a and are connected with the front side ends of the middle magnet yoke s509b.

The front side yoke 509a is configured in front of the Z direction of the second coils 504. That is to say, the front side faces 505b of the second coils 504 and the permanent magnets 505 are configured under the Z direction of the front side yoke 509a, and are oppositely disposed with each other and spaced at an interval in the Z direction. Moreover, the middle magnet yokes 509b are configured on the inner side of the four corners 503s of the first coil 503, and the middle magnet yokes 509b are arranged to face the four corners 503s with spacing in radial direction. 3s are oppositely disposed with each other and spaced at intervals in radial direction.

As shown in FIG. 16 in detail, the first spring components 507 include the front side first spring component 507A and the back side first spring component 507B which are formed into plate-like shape.

The front side first spring component 507A includes a circular arc-shaped inner side retaining part 507Aa which extends along the surface perpendicular to the Z direction and is cut into four parts, a rectangular outer side retaining part 507Ab which is cut into two parts in diagonal position, and four wrists 507Ac which are bent in a snaking manner along the circumferential direction and simultaneously extend in radial direction, and connect the inner side retaining part 507Aa with the outer side retaining part 507Ab together. The back side first spring component 507B includes a circular arc-shaped inner side retaining part 507Ba which extends along the surface perpendicular to the Z direction and is cut into four parts, a rectangular outer side retaining part 507Bb whose four square corner parts are cut away, and four wrists 507Bc which are bent in a snaking manner along the circumferential direction and simultaneously extend in radial direction, and connect the inner side retaining part 507Ba with the outer side retaining part 507Bb together. These wrists 507Ac and 507Bc take effects as springs for suspended supporting the carrier bracket 502 on the base 508.

The inner side retaining part 507Aa of the front side first spring component 507A is connected with the front surface of the front side carrier bracket 502A in the Z direction, and the inner side retaining part 507Ba of the back side first spring component 507B is connected with the back surface of the connecting part 502a in the back side carrier bracket 502B. Moreover, the outer side retaining parts 507Ab and 507Bb for retaining the first spring components 507 are connected with the base 508. Specifically, as shown in FIG. 17, the outer side retaining part 507Ab for retaining the front side first spring component 507A is connected with the front surface of the front side yoke 509a of the magnet yoke 509, and the outer side retaining part 507Bb for retaining the back side first spring component 507B is connected with the front surface of the back side spacer 511 configured on the front side of the base 508. Therefore, the carrier bracket 502 is supported to move in the Z direction relative to the base 508 by the first spring components 507.

Hereon, the outer side retaining parts 507Ab and 507Bb of the front side and the back side first spring components 507A and 507B are connected with the base 508 at the position closer to the back of the Z direction than the inner side retaining parts 507Aa and 507Ba, namely at an offset state. Therefore, preload is applied to the carrier bracket 502 in the −Z direction, namely the direction opposite to the object to be shot, by the front side and the back side spring components 507A and 507B for moving, and when the first coil 503 is not electrified, the back end 502c of the back side carrier bracket 502B abuts against the limiting part 508c of the base 508 is retained at the most backward position.

For the lens driving device 500 with image stabilizer function in the above structure, if the X side coil 504X is electrified, the Lorentz force in the +X direction or the −X direction is generated on the X side coil 504X, while the lens carrier 501 swings in the +X direction or the −X direction to a balanced position where a restoring force of the second spring component 506 equals to the Lorentz force in the −X direction or the +X direction. Similarly, if the Y side coil 504Y is electrified, the Lorentz force in the +Y direction or the −Y direction is generated on the Y side coil 504Y for swinging, so that the lens carrier 501 swings in the +Y direction or the −Y direction to a balanced position where a restoring force of the second spring component 506 equals to the Lorentz force in the −Y direction or the +Y direction. Moreover, if the X side and the Y side coils 504X and 504Y are electrified at the same time, the lens carrier 501 can swing in the appropriate X and Y synthesis direction according to the size of the current supplied to the X side and the Y side coils 504X and 504Y respectively.

If the first coil 503 is electrified, the Lorentz force in the +Z direction is generated on the first coil 503, and the carrier bracket 502 can move forwards to a balanced position where a restoring force of the first spring component 507 equals to the Lorentz force in the −Z direction. Therefore, the lens carrier 501 is suspended supported on the carrier bracket 502 and the carrier bracket 502 can move forwards in the Z direction together.

Therefore, the lens driving device 500 with image stabilizer function in the second embodiment of the present invention can enable the carrier bracket 502 supporting the lens carrier 501 to move in the Z direction, thus enable the lens loaded on the lens carrier 501 to focus, and the lens carrier 501 can swing in the X direction or the Y direction to realize image stabilizer function during automatic focusing.

Taken the optical axis of the unshown lens as the Z direction as follows, and the object-side direction is hereafter referred as a forward direction of the Z axis (+Z side). The lens driving device 500 with image stabilizer function in the second embodiment of the present invention includes: a lens carrier 501 for retaining the lens taking the unshown lens, a carrier bracket 502, permanent magnets 505, a first coil 503, second coils 504, a base 508, first spring components 507, and second spring components 506. Each second spring component 506 extends in the Z direction, one end of the second spring component is connected with the carrier bracket 502, and the other end of the second spring component is connected with the lens carrier 501. Each first spring component 507 extends along the direction perpendicular to Z axis, one end of the first spring component is connected with the carrier bracket 502, and the other end of the first spring component is connected with the base 508. The first coil 503 is wound around the Z axis and disposed on the carrier bracket 502. The second coils are disposed on the lens carrier 501 in front of the permanent magnets and are wound around the Z axis. Each permanent magnet 505 is disposed on the outer side of the second coil 504, on the base 508, and enables the magnetic pole face 505a to be facing the inner side. The spiral wind surface of the second coil 504 is arranged to face the front side face 505b of the permanent magnet 505 with spacing therebetween; and the side surface adjacent to the winding surface of the first coil 503 is arranged to face the magnetic pole face 505a of the permanent magnet 505 with spacing therebetween. Therefore, the lightweight swing part can be formed. Thus, even through the posture of the camera changes, the second spring component 506 can be with little flexural deformation, thus the off-centering of the lens is reduced.

Therefore, the lens driving device with image stabilizer function in the second embodiment of the present invention does not need to load additional components such as the position detecting mechanisms or the offset correcting control circuits, so that the miniaturization, low cost and low power consumption can be realized.

The above describes main constitution components of the lens driving device 500 with image stabilizer function in the second embodiment of the present invention, and then the assembling structure of the lens driving device 500 with image stabilizer function of the embodiment is described according to FIG. 17.

After several semi-assemblies formed by combining a plurality of components are assembled, single components and semi-assemblies are assembled in sequence into the lens driving device 500 with image stabilizer function.

Firstly, the second coils 504 are disposed at the back surface of the retaining part 501b of the lens carrier 501 so as to form a lens carrier assembly.

Then, the permanent magnets 505 are respectively inserted in the dents 512a of four parts on the inner wall of a square frame-shaped magnet support 512 so as to be taken as a magnet assembly.

Moreover, the first coil 503 is disposed on the retaining part 502s of the back side carrier bracket 502B, and the back ends of the four second spring components 506 are connected with the connecting parts 502a, so that the front surface inner side retaining part 507Ba of the back side first spring component 507B is connected with the back surface of the back side carrier bracket 502B so as to be assembled into a carrier bracket assembly.

Moreover, the terminal 510 is disposed on the X side edge of the base 508, and the back side spacer 511 is disposed on the front surface of the base 508 so as to form a base assembly. The terminal 510 is connected with an unshown power source outside, and supplies working current to the first coil 503 and the second coils 504.

The above semi-assemblies prepared in advance are assembled together with other single components according to the sequence as shown in the following.

Namely, the carrier bracket assembly is disposed on the base assembly, and the outer side retaining part 507Bb of the back side first spring component 507B connected with the carrier bracket assembly is connected with the back side spacer 511. The magnet assembly is disposed on the device, and the outer side retaining part 507Bb of the back side first spring component 507B is clamped by the back side spacer 511 and the back end of the magnet support 512.

Then, the lens carrier assembly is inserted in the inner side of the carrier bracket assembly, so that the front end of the second spring component 506 is connected with the retaining part 501b of the lens carrier 501. Then, the front side carrier bracket 502A is configured in front of the lens carrier 501, and the front side carrier bracket 502A is connected with the front end of the retaining part 502s of the back side carrier bracket 502B. The magnet yokes 509 are configured in front of these components, and the middle magnet yokes 509b are inserted in the inner side of the four corner parts 503s of the first coil 503, so that the back surface of the front side yoke 509a is connected with the front ends of the projection parts 512b of the four corner parts of the magnet support 512.

Then, the front side first spring component 507A is configured in front of the front side carrier bracket 502A, so that the back surface of the inner side retaining part 507Aa is connected with the front end face of the front side carrier bracket 502A, and the back surface of the outer side retaining part 507Ab is connected with the front surface of the front side yoke 509a. Moreover, the cover 513 is disposed on the front surface of the front side first spring component 507A, and the outer side retaining part 507Ab of the front side first spring component 507A is clamped by the front side yoke 509a and the cover 513. Finally, a shielding box body 514 is covered, the electromagnetic waves can be prevented from emitting inside and outside the camera by wrapping the whole assembled component, and the damage or deformation of the components due to the external force can be prevented.

Moreover, FIG. 12 is a simplified diagram for easy judgment in order to describe the conception of the present invention; compared with the decomposition perspective view of FIG. 17, the simplified diagram can illustrate that the connecting parts of the first spring component 507 are locally different, but no attached drawing can deviate from the conception of the present invention.

Figure 18:
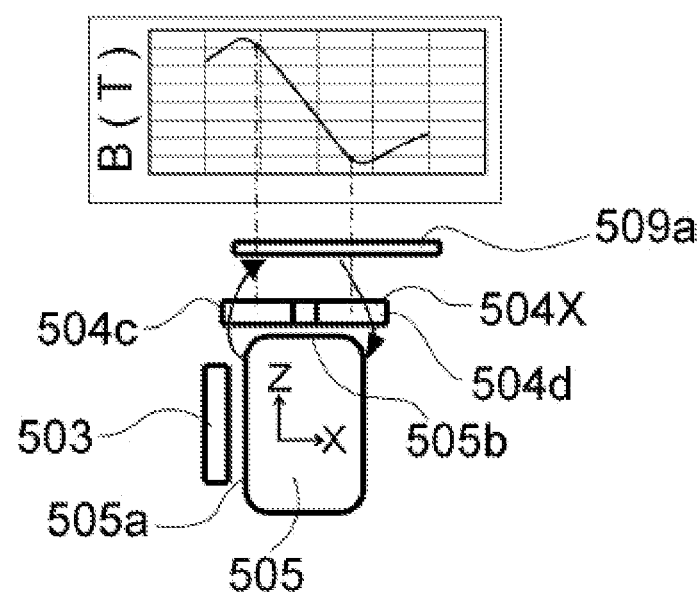
FIG. 18 is a curve diagram of magnetic flux density applied on the second coil in the lens driving device with image stabilizer function according to the second embodiment.

FIG. 18 is a curve diagram of size change of magnetic flux density B(T) on the central part of the inner side winding edge 504c and the outer side winding edge 504d of the X side coil 504X on the +X side. When the magnetic pole face 505a of the permanent magnet 505 is taken as N pole, the magnetic flux in the +Z direction is applied to the inner side winding edge 504c, and the magnetic flux in the −Z direction is applied to the outer side winding edge 504d, thus high-efficiency swinging operation can be carried out. Thus, when the X side coil 504X for swinging on the +X side is electrified in Z direction counterclockwise and the X side coil 504X on the −X side is electrified in Z direction clockwise, powerful Lorentz force in the +X direction can be generated on the X side coils 504X on the +X direction and the −X direction respectively. As a result, the lightweight swing part including the unshown lens, the lens carrier 501 and the second coils 504 can swing efficiently in the +Y direction. Moreover, if the electrification directions are opposite, the swing part can swing efficiently in the −X direction. Similarly, if the Y side coil 504X is electrified, the swing part also can swing efficiently in the +Y direction or the −Y direction according to the electrification direction.

Moreover, if the X side and the Y side coils 504X and 504Y are electrified at the same time, the swing part can swing efficiently in the appropriate X and Y synthesis direction according to the size of electric charge quantity for the X side coil 504X and the Y side coil 504Y.

And then, if the front side yoke 509a is configured in front of the second coils 504 and disposed on the base 508, the running efficiency of the second coils 504 can be further improved without increasing the weight of the swing part. Namely, the magnetic flux density B in the Z direction generated on the magnetic pole face 505a of the permanent magnets 505 and applied on the inner side and the outer side winding edges 504c and 504d of the second coils 504 can be improved, thus the Lorentz force generated on the second coils 504 after being electrified can be enhanced, and the operation with high swinging efficiency can be carried out.

Moreover, if the middle magnet yoke 509b is disposed in the magnet yoke 509 and inserted in the inner sides of the four corner parts 503s of the first coil 503, the magnetic flux P generated on the corner parts of the magnetic pole face 505a of the permanent magnet 505 can be converged onto the middle magnet yoke 509b as shown in FIG. 15B, and the magnetic flux P is guided onto the magnetic pole face 505c on the opposite side through the guiding part 509c and the outer circumferential part of the front side yoke 509a. Thus, the magnetic flux Q reversely applied on the corner parts 503s of the first coil 503 is inhibited, thus the corner parts 503s can be prevented from generating the Lorentz force in the −Z direction, and the running efficiency, namely the automatic focusing driving efficiency, of the first coil 503 can be improved.

As mentioned above, in the lens driving device 500 with image stabilizer function in the second embodiment of the present invention, the swing part is formed to be lightweight, thus the flexural deformation of the second spring component 506 also can be reduced even if the posture of the camera changes, and the lens off-centering can be reduced.

Moreover, the front side face 505b of the permanent magnet 505 and the second coils 504 wound around the Z axis are oppositely disposed and spaced at an interval, thus the magnetic flux density B applied on the second coils 504 can be improved, and the swinging operation can be carried out efficiently. Thus, by utilizing the second spring component 506 with great spring coefficient, the flexural deformation of the second spring component 506 is reduced.

Moreover, the front side yoke 509a is disposed on the base 508 in front of the front side face 505b of the permanent magnet 505, thus the magnetic flux density B applied on the second coils 504 also can be further improved without increasing the weight of the swing part, so that the swinging thrust force generated by the second coil 504 is further enhanced. Thus, by further improving the spring coefficient of the second spring components 506, the flexural deformation of the second spring component 506 can be reduced further.

Therefore, the present invention can provide a lens driving device 500 with image stabilizer function capable of reducing the off-centering caused by posture change of the camera, and the additional components such as the position detecting mechanisms or the offset correcting control circuits are not needed to be loaded, thus the minimization, low cost and low power consumption can be realized.

Moreover, the middle magnet yoke 509b is disposed on the inner circumferential side of four corner parts 503s of the first coil 503, thus the reverse magnetic flux Q applied on the four corner parts 503s of the first coil 503 can be decreased, and the moving thrust force generated by the first coil 503, namely the automatic focusing driving efficiency, can be improved. Therefore, focusing driving can be performed with low power, so low power consumption can be realized.

Figure 19:
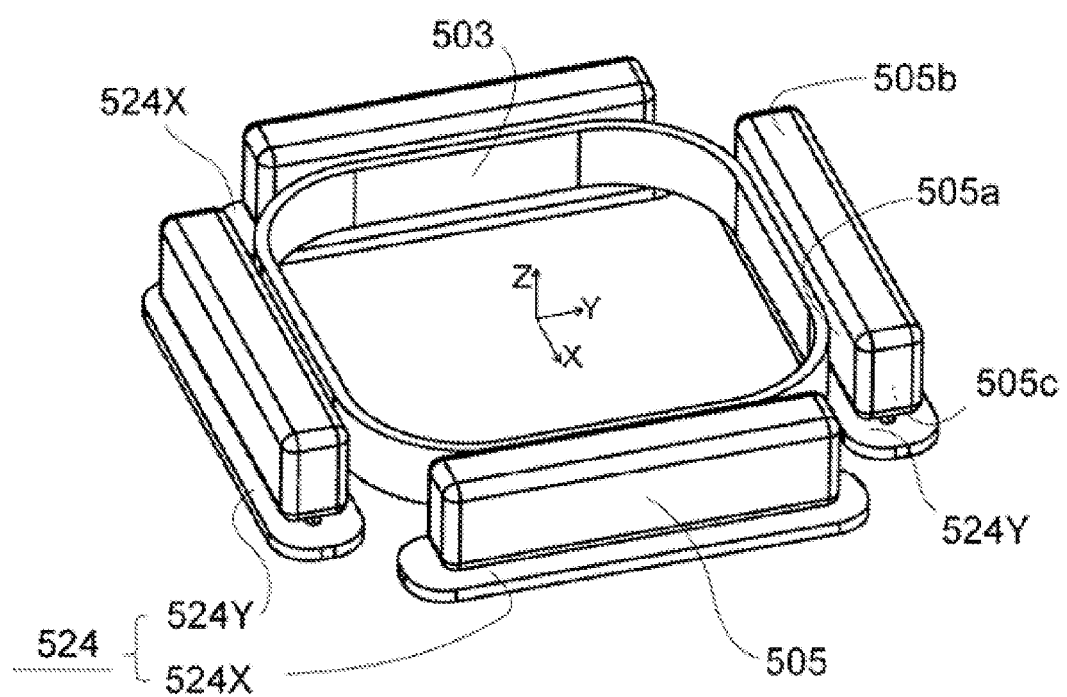
FIG. 19 is a perspective view of another structure of the permanent magnets, a first coil and second coils in the lens driving device with image stabilizer function according to the second embodiment.

Moreover, besides the embodiment that the second coils 504 in the lens driving device with image stabilizer function 500 in the second embodiment are disposed in front of the permanent magnet 505, a back second coils 524 including a pair of back X side coils 524X and a pair of back Y side coils 524Y as shown in FIG. 19 is configured at the back of the permanent magnets 505.

Figure 20:
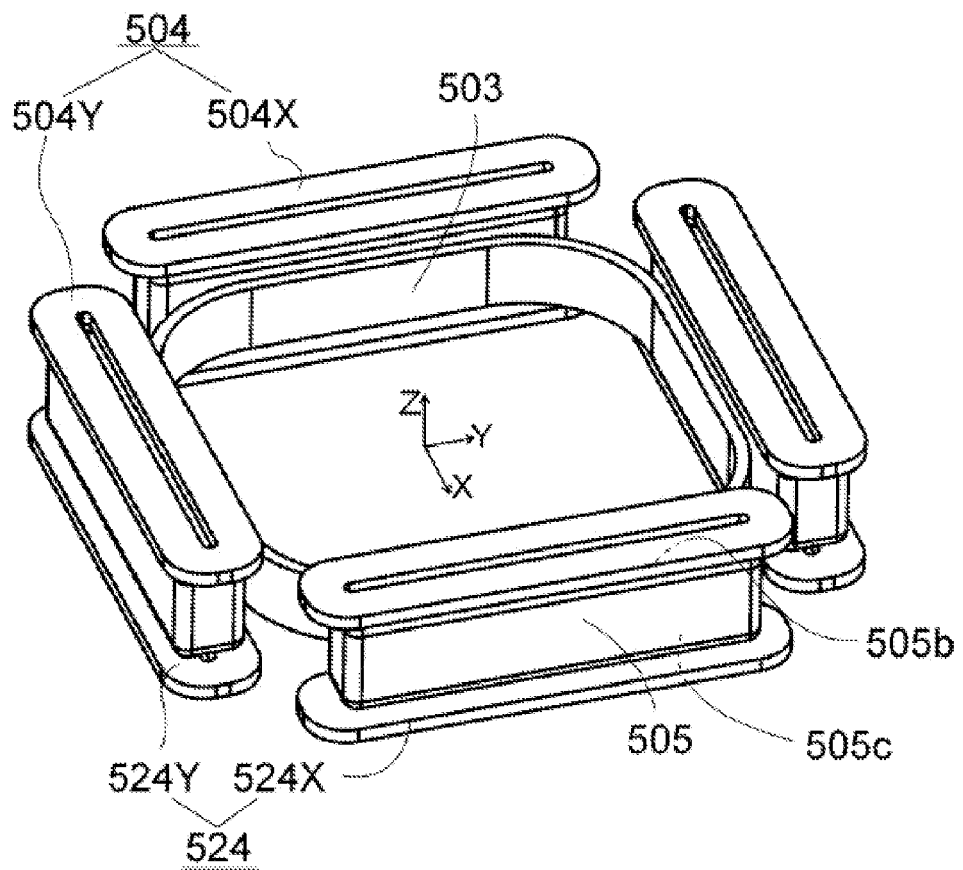
FIG. 20 is a perspective view of further another structure of the permanent magnets, a first coil and second coils in the lens driving device with image stabilizer function according to the second embodiment.
Figure 21A:
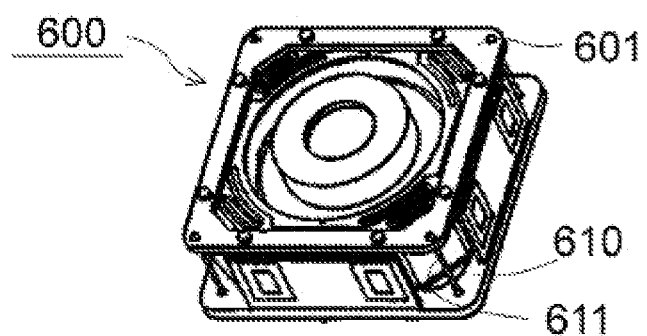
FIG. 21A is a perspective view illustrating a traditional lens driving device with image stabilizer function.
Figure 21B:
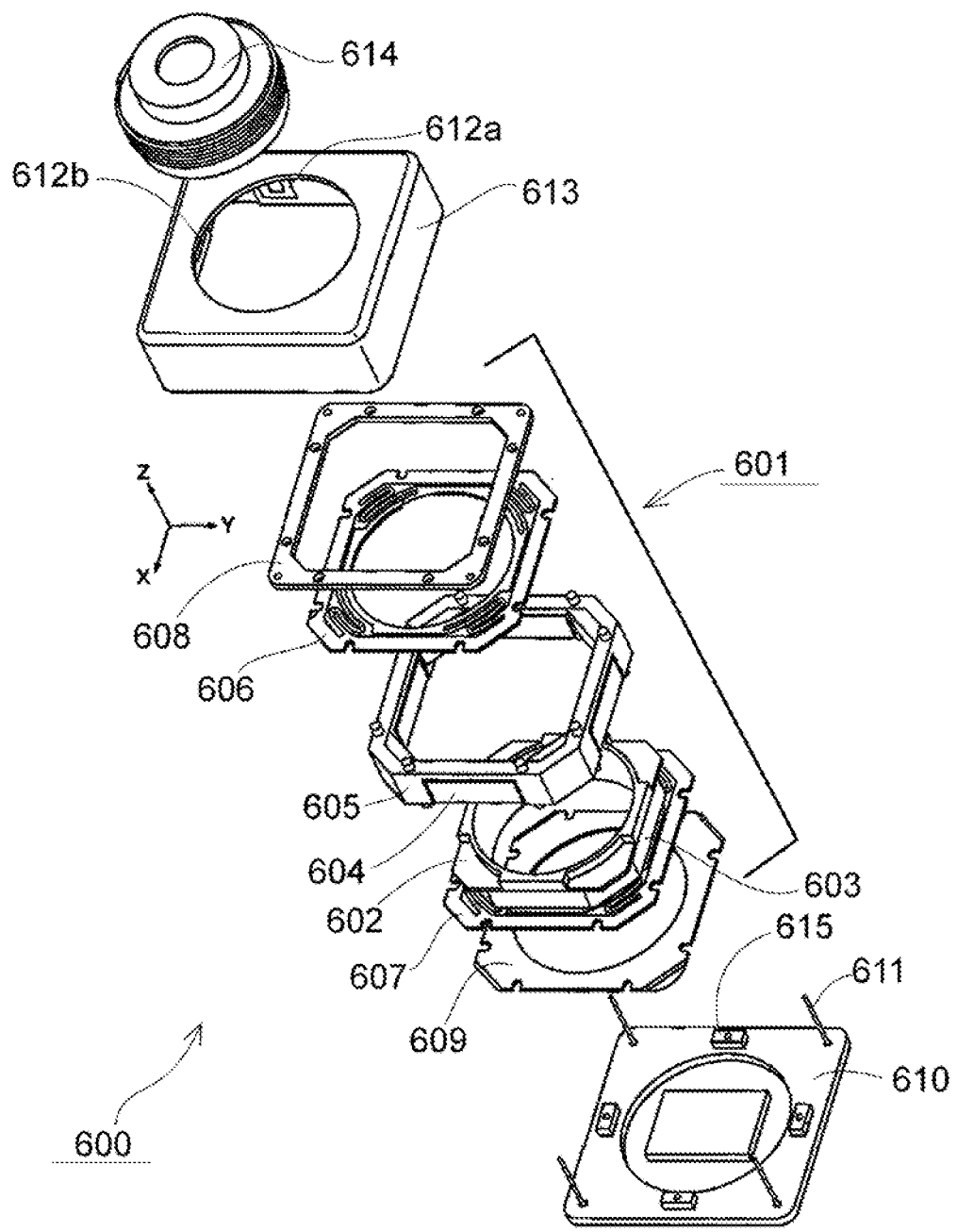
FIG. 21B is an exploded view of the traditional lens driving device of FIG. 21A.

Furthermore, the second coils 504 including the X side coils 504X and the Y side coils 504Y as shown in FIG. 20 also can be configured in front of the permanent magnets 505, and the back second coils 524 including the back X side coils 524X and the back Y side coils 524Y are configured at the back of the permanent magnets 505. Under such circumstances, the second coils 504 and the back second coils 524 are respectively wound around the Z axis and disposed on the lens carrier, and the spiral wind surfaces are disposed at the position opposite to the front side face 505b or the back surface 505c of the permanent magnet 505 at an interval.

The embodiments of the present invention described hereinbefore are exemplary embodiments and not intended to limit the scope of the present invention. It is apparent for those skilled in this field that various modifications and improvements can be made to the present invention. It is apparent from the claims that the modifications and improvements are included in the spirit and scope and spirit of the present invention.

What is claimed is:

1. A lens driving device with image stabilizer function, comprising:
   a lens carrier for mechanically holding a lens whose optical axis is defined as Z axis and an object to be shot is desired to be positioned in the +Z direction;
   a carrier bracket;
   a base;
   at least one first coil wound around the Z axis and disposed on the carrier bracket;
   a plurality of second coils wound around one or more axis perpendicular to the Z axis, the plurality of second coils being disposed on the lens carrier and on an outer side of the at least one first coil;
   a plurality of permanent magnets disposed on outer sides of the plurality of the second coils, one of magnetic pole faces of each permanent magnet being arranged towards the center of the lens;
   at least one first spring component extending along a plane perpendicular to the Z axis, one end of each first spring component being connected to the carrier bracket, another end of each first spring component being connected to the base; and
   a plurality of second spring components extending in the Z direction, one end of each second spring component being connected to the carrier bracket, and another end of each second spring component being connected to the lens carrier;
   wherein a spiral wind surface of each second coil faces to and is spaced apart from the magnetic pole face of a corresponding one of the permanent magnets which is arranged towards the center of the lens at an interval; a side surface adjacent to the spiral wind surface of each first coil faces to and is spaced apart from the magnetic pole faces which are arranged towards the center of the lens of the permanent magnets through center openings of the second coils;
   wherein the lens driving device further comprises a magnet yoke assembly comprising a plurality of side face magnet yokes and retained on the base, wherein each side face magnet yoke is arranged to face to and be spaced apart from a side face of a corresponding one of the permanent magnets, the side face of the corresponding permanent magnet is adjacent to the magnetic pole face which is arranged towards the center of the lens;
   wherein the magnet yoke assembly further comprises a plurality of inner side yokes, wherein each inner side yoke is arranged to face to and be spaced apart from the magnetic pole face which is arranged towards the center of the lens of a corresponding permanent magnet, the at least one first coil is disposed between the inner side yokes and the permanent magnets, and there are gaps between the at least one first coil and the inner side yokes;
   wherein each first coil is wound around the Z axis and formed in an octagonal frame shape, and is configured on an inner sides of the plurality of permanent magnets, every other side face of the first coil is wound to be protruded out through an central opening of a corresponding one of the plurality of second coils, and faces the permanent magnet with an interval therebetween.

2. The lens driving device with image stabilizer function of claim 1, wherein each inner side yoke extends from an inner side which defines an opening of a corresponding one of the plurality of side face magnet yokes along the surface of the side face magnet yoke and then bends to extend in the Z direction.

* * * * *